United States Patent
Nash et al.

(10) Patent No.: US 11,925,251 B2
(45) Date of Patent: Mar. 12, 2024

(54) SYSTEM AND METHOD FOR HAIR DYE COLOR CONVERSION

(71) Applicant: SureTint Technologies, LLC, Chicago, IL (US)

(72) Inventors: Cody Z. Nash, Chicago, IL (US); Teresa Perkins Adams, Chicago, IL (US); Christopher Byrne, Chicago, IL (US); Elizabeth Christie, Chicago, IL (US)

(73) Assignee: SureTint Technologies, LLC, Chicago, IL (US)

( * ) Notice: Subject to any disclaimer, the term of this patent is extended or adjusted under 35 U.S.C. 154(b) by 0 days.

(21) Appl. No.: 17/678,413

(22) Filed: Feb. 23, 2022

(65) Prior Publication Data

US 2022/0175115 A1   Jun. 9, 2022

Related U.S. Application Data

(63) Continuation of application No. 17/127,767, filed on Dec. 18, 2020, now Pat. No. 11,344,103, which is a
(Continued)

(51) Int. Cl.
*A61Q 5/10* (2006.01)
*A45D 44/00* (2006.01)
(Continued)

(52) U.S. Cl.
CPC ........... *A45D 44/005* (2013.01); *G05B 17/02* (2013.01)

(58) Field of Classification Search
CPC .... A45D 44/005; G05B 17/02; G06K 9/4652; A61Q 5/10; A61Q 5/065; G06T 11/001;
(Continued)

(56) References Cited

U.S. PATENT DOCUMENTS 3,122,272 A   2/1964   Marsh
3,416,517 A   12/1968   Adams et al.
(Continued)

FOREIGN PATENT DOCUMENTS

DE   203 07 083 U1   9/2003
DE   10 2005 031 269 B3   12/2006
(Continued)

OTHER PUBLICATIONS

Berns, *Billmeyer and Salzman's Principles of Color Technology*, Fourth Edition, Chapter 9, "Optical Modeling of Colored Materials," pp. 169-188, John Wiley & Sons, Inc., 2019. (20 pages).

*Primary Examiner* — Wesner Sajous
(74) *Attorney, Agent, or Firm* — Seed IP Law Group LLP

(57) ABSTRACT

A system and method is provided for hair dye color conversion in which a hair dye color mixture of one manufacture is matched and reproduced using a hair dye color mixture of an another manufacture. The system and method duplicates a resultant hair color from a hair dye color mixture that was created using hair dye colors of a first hair dye color line using a different hair dye color mixture that was created using hair dye colors of a second hair dye color line. The system and method applies a modified Kubelka-Munk transformation of RGB values to the mathematical RGB data of the multiple hair dye colors for the first manufacturer color line, multiplies the modified KM transformed values of the multiple hair dye colors for the first manufacturer color line by their respective percentages and then summing them, and retransforms the summed modified KM transformed values of the multiple hair dye colors back into mathematical RGB values in the original RGB color space. Additionally, in some embodiments, the system and method apply a correction factor to the retransformed math-
(Continued)

ematical RGB values that corrects for RGB errors, wherein the correction factor employs a regression algorithm.

25 Claims, 7 Drawing Sheets

Related U.S. Application Data continuation of application No. 16/569,561, filed on Sep. 12, 2019, now Pat. No. 10,897,979.

(51) Int. Cl.

| | |
|---|---|
| *G05B 17/02* | (2006.01) |
| *G06K 9/46* | (2006.01) |
| *G06T 11/00* | (2006.01) |
| *H04N 1/60* | (2006.01) |

(58) Field of Classification Search
CPC ... G06T 7/90; G06T 2207/10024; G09G 5/02; G09G 5/06; G09G 2320/0682; G09G 2320/06; H04N 1/56; H04N 1/60; H04N 1/6002; H04N 1/6027; H04N 9/64; H04N 9/73; H04N 9/76; H04N 5/57; H04N 5/58
See application file for complete search history.

(56) References Cited

U.S. PATENT DOCUMENTS

| | | | |
|---|---|---|---|
| 3,878,907 A | 4/1975 | Morick | |
| 4,046,287 A | 9/1977 | Hoekstra et al. | |
| 4,434,467 A | 2/1984 | Scott | |
| 4,469,146 A | 9/1984 | Campbell et al. | |
| 4,637,527 A | 1/1987 | Arrigoni | |
| 4,656,600 A | 4/1987 | Swann | |
| 4,697,938 A | 10/1987 | Sakura et al. | |
| 4,705,083 A | 11/1987 | Rossetti | |
| 4,792,236 A | 12/1988 | Heinis et al. | |
| 4,840,239 A | 6/1989 | Slagg | |
| 4,871,262 A | 10/1989 | Krauss et al. | |
| 4,967,938 A | 11/1990 | Hellenberg | |
| 5,078,302 A | 1/1992 | Hellenberg | |
| 5,119,973 A | 6/1992 | Miller et al. | |
| 5,153,825 A | 10/1992 | Yauk et al. | |
| 5,163,010 A | 11/1992 | Klein et al. | |
| 5,193,720 A | 3/1993 | Mayberry | |
| 5,268,849 A | 12/1993 | Howlett et al. | |
| 5,328,057 A | 7/1994 | Hellenberg et al. | |
| 5,365,722 A | 11/1994 | Edwards et al. | |
| 5,368,196 A | 11/1994 | Hellenberg et al. | |
| 5,402,834 A | 4/1995 | Levin et al. | |
| 5,474,211 A | 12/1995 | Hellenberg | |
| 5,487,603 A | 1/1996 | Hoff et al. | |
| 5,493,840 A | 2/1996 | Cane | |
| 5,511,695 A | 4/1996 | Chia et al. | |
| 5,544,684 A | 8/1996 | Robinette, III | |
| 5,554,197 A | 9/1996 | Assini et al. | |
| 5,558,251 A | 9/1996 | Neri | |
| 5,632,314 A | 5/1997 | Koppe et al. | |
| 5,697,527 A | 12/1997 | Altieri, Jr. et al. | |
| 5,711,458 A | 1/1998 | Langeveld et al. | |
| 5,784,854 A | 7/1998 | Mazzalveri | |
| 5,855,626 A | 1/1999 | Wiegner et al. | |
| 5,862,947 A | 1/1999 | Wiegner et al. | |
| 5,938,080 A | 8/1999 | Haaser et al. | |
| 5,992,691 A | 11/1999 | Post et al. | |
| 6,003,731 A | 12/1999 | Post et al. | |
| 6,089,408 A | 7/2000 | Fox | |
| 6,164,499 A | 12/2000 | Chia | |
| 6,180,892 B1 | 1/2001 | Li | |
| 6,191,371 B1 | 2/2001 | Olberg et al. | |
| 6,360,961 B1 | 3/2002 | Marazzi | |
| 6,490,492 B1 | 12/2002 | Fertig et al. | |
| 6,510,366 B1 | 1/2003 | Murray et al. | |
| 6,672,341 B2 | 1/2004 | Bartholomew et al. | |
| 6,782,307 B2 | 8/2004 | Wilmott et al. | |
| 6,856,861 B2 | 2/2005 | Dirksing et al. | |
| 6,935,386 B2 | 8/2005 | Miller et al. | |
| 6,991,004 B2 | 1/2006 | Kaufhold et al. | |
| 7,099,740 B2 | 8/2006 | Bartholomew et al. | |
| 7,121,430 B2 | 10/2006 | Mink et al. | |
| 7,147,012 B2 | 12/2006 | Kaufhold et al. | |
| 7,185,789 B2 | 3/2007 | Mink et al. | |
| 7,557,311 B2 | 7/2009 | Umemoto | |
| 7,654,416 B2 | 2/2010 | Buining et al. | |
| 7,690,405 B2 | 4/2010 | Miller et al. | |
| 7,873,435 B2 | 1/2011 | Yuyama et al. | |
| 7,963,303 B2 | 6/2011 | Saranow et al. | |
| 8,336,582 B2 | 12/2012 | Saranow | |
| 8,393,358 B2 | 3/2013 | Saranow | |
| 8,897,915 B2 | 11/2014 | Saranow | |
| 9,073,026 B2 | 7/2015 | Engels et al. | |
| 9,149,108 B2 | 10/2015 | Miller et al. | |
| 9,177,339 B2 | 11/2015 | Saranow et al. | |
| 9,414,665 B2 | 8/2016 | Saranow et al. | |
| 9,504,306 B2 | 11/2016 | Miller et al. | |
| 9,524,605 B2 | 12/2016 | Saranow et al. | |
| 9,567,118 B2 | 2/2017 | Rodrigues | |
| 9,839,278 B2 | 12/2017 | Saranow et al. | |
| 9,877,569 B2 | 1/2018 | Miller et al. | |
| 9,919,278 B2 | 3/2018 | Saranow et al. | |
| 10,143,984 B2 | 12/2018 | Krom, Jr. et al. | |
| 10,182,638 B2 | 1/2019 | Saranow et al. | |
| 10,716,386 B2 | 7/2020 | Miller et al. | |
| 10,897,979 B1* | 1/2021 | Nash | G01J 3/462 |
| 11,235,298 B2 | 2/2022 | Saranow et al. | |
| 11,246,395 B2 | 2/2022 | Saranow et al. | |
| 11,344,103 B2* | 5/2022 | Nash | G01J 3/463 |
| 2002/0071604 A1 | 6/2002 | Orpaz et al. | |
| 2002/0124017 A1 | 9/2002 | Mault | |
| 2003/0065450 A1 | 4/2003 | Leprince | |
| 2004/0103035 A1 | 5/2004 | Pitsch | |
| 2004/0122553 A1 | 6/2004 | Phan et al. | |
| 2004/0159676 A1 | 8/2004 | Adema | |
| 2004/0243259 A1 | 12/2004 | Peterson et al. | |
| 2004/0247421 A1 | 12/2004 | Saunders et al. | |
| 2005/0092772 A1 | 5/2005 | Miller et al. | |
| 2005/0130613 A1 | 6/2005 | Kutsuna et al. | |
| 2005/0165705 A1 | 7/2005 | Lauper et al. | |
| 2005/0194403 A1 | 9/2005 | Mink et al. | |
| 2005/0252934 A1 | 11/2005 | Miller et al. | |
| 2005/0264794 A1 | 12/2005 | Inzinna, Jr. et al. | |
| 2005/0278870 A1 | 12/2005 | Gaspini | |
| 2006/0033907 A1 | 2/2006 | Inzinna, Jr. | |
| 2006/0124743 A1 | 6/2006 | Venema et al. | |
| 2006/0181707 A1 | 8/2006 | Gibson et al. | |
| 2006/0231578 A1 | 10/2006 | Mink et al. | |
| 2006/0261089 A1 | 11/2006 | Mink et al. | |
| 2006/0283521 A1 | 12/2006 | Bartholomew et al. | |
| 2007/0044863 A1 | 3/2007 | Engels et al. | |
| 2007/0084520 A1 | 4/2007 | Driessen et al. | |
| 2007/0124009 A1 | 5/2007 | Bradley et al. | |
| 2007/0199159 A1 | 8/2007 | Schmenger et al. | |
| 2007/0222547 A1 | 9/2007 | Stahle et al. | |
| 2008/0178399 A1 | 7/2008 | Vena et al. | |
| 2009/0218007 A1 | 9/2009 | Saranow et al. | |
| 2009/0248199 A1 | 10/2009 | Milhorn | |
| 2010/0175931 A1 | 7/2010 | Amato | |
| 2010/0318220 A1 | 12/2010 | Saranow et al. | |
| 2011/0100504 A1 | 5/2011 | Saranow et al. | |
| 2012/0075331 A1 | 3/2012 | Mallick et al. | |
| 2012/0127819 A1 | 5/2012 | Saranow et al. | |
| 2012/0152406 A1 | 6/2012 | Bartholomew et al. | |
| 2013/0123923 A1 | 5/2013 | Pavlov et al. | |
| 2013/0123973 A1* | 5/2013 | Saranow | A45D 19/00 |
| | | | 700/233 |
| 2013/0261798 A1 | 10/2013 | Saranow et al. | |
| 2014/0082854 A1 | 3/2014 | Landa et al. | |
| 2015/0082553 A1 | 3/2015 | Landa et al. | |
| 2015/0089751 A1 | 4/2015 | Landa et al. | |
| 2017/0035186 A1 | 2/2017 | Saranow et al. | |
| 2017/0071317 A1 | 3/2017 | Miller et al. | |
| 2017/0119130 A1* | 5/2017 | Witchell | G01N 21/31 |

(56) References Cited

U.S. PATENT DOCUMENTS

| | | |
|---|---|---|
| 2017/0189870 A1 | 7/2017 | Saranow et al. |
| 2017/0206678 A1* | 7/2017 | Kowalczyk .......... H04N 1/6027 |
| 2018/0103743 A1* | 4/2018 | McKenzie ......... B65D 21/0209 |
| 2018/0168321 A1 | 6/2018 | Saranow et al. |
| 2018/0220777 A1 | 8/2018 | Miller et al. |
| 2018/0257052 A1 | 9/2018 | Saranow et al. |
| 2019/0144178 A1* | 5/2019 | McKenzie ......... B65D 41/0492 |
| | | 132/294 |
| 2019/0218002 A1* | 7/2019 | McKenzie ......... B65D 21/0234 |
| 2020/0015574 A1* | 1/2020 | Witchell ................ A61B 5/448 |
| 2020/0121583 A1* | 4/2020 | Russell .................... A61Q 5/10 |
| 2020/0239206 A1* | 7/2020 | McKenzie ............. B65D 81/32 |
| 2022/0297907 A1* | 9/2022 | McKenzie ............... A61K 8/22 |
| 2022/0332481 A1* | 10/2022 | McKenzie ......... B65D 21/0234 |

FOREIGN PATENT DOCUMENTS

| | | | |
|---|---|---|---|
| EP | 0 484 564 | A1 | 5/1992 |
| EP | 1 093 842 | A1 | 4/2001 |
| EP | 1 240 845 | A1 | 9/2002 |
| EP | 2 193 781 | A1 | 6/2010 |
| FR | 2 619 730 | A1 | 3/1989 |
| JP | 58-41966 | A | 3/1983 |
| JP | 5-140470 | A | 6/1993 |
| JP | 2002-15056 | A | 1/2002 |
| JP | 2002-123723 | A | 4/2002 |
| JP | 2002-524172 | A | 8/2002 |
| JP | 2003-33217 | A | 2/2003 |
| JP | 2009-536532 | A | 10/2009 |
| JP | 2012-510104 | A | 4/2012 |
| KR | 2000-0059262 | A | 10/2000 |
| TW | 200831887 | A | 8/2008 |
| TW | 201022980 | A1 | 6/2010 |
| WO | 02/083282 | A1 | 10/2002 |
| WO | 03/090914 | A2 | 11/2003 |
| WO | 2004/101689 | A2 | 11/2004 |
| WO | 2010/058381 | A1 | 5/2010 |
| WO | 2010/100231 | A1 | 9/2010 |
| WO | 2011/024160 | A1 | 3/2011 |
| WO | 2012/112497 | A2 | 8/2012 |

\* cited by examiner

260 — Accessing color scanning analysis of multiple hair dye colors of a first manufacturer color line from color swatches post dye-out to obtain mathematical RGB data for each of the multiple hair dye colors, wherein the mathematical RGB data is in an original RGB color space

265 — Converting the mathematical RGB data of the multiple hair dye colors for the first manufacturer color line into a product matrix that accounts different hair dye color percentages in the hair dye color mixture

270 — Applying a transformation to RGB values to the mathematical RGB data of the multiple hair dye colors for the first manufacturer color line, wherein the transformation is a modified Kubelka-Munk transformation

275 — Multiplying the modified KM transformed values of the multiple hair dye colors for the first manufacturer color line by their respective percentages and then summing them

280 — Retransforming the summed modified KM transformed values of the multiple hair dye colors back into mathematical RGB values in the original RGB color space

285 — Applying a correction factor to the retransformed mathematical RGB values that corrects for RGB errors, wherein the correction factor employs a regression algorithm

290 — Determining multiple hair dye colors of the second manufacturer color line that combine to create the retransformed mathematical RGB values for the hair dye color mixture in the second manufacturer color lines

FIG. 2B

Baseline Prediction

Model 1 Prediction

SYSTEM AND METHOD FOR HAIR DYE COLOR CONVERSION

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Technical Field

The present disclosure relates to a system and method for hair dye color conversion, and more particularly to system and method for hair dye color conversion in which a hair dye color mixture of one manufacture is matched and reproduced using a hair dye color mixture of an another manufacture.

Description of the Related Art

The field of hair dye technology presents many unique challenges and obstacles. Unlike paint or ink that remains on the surface of the material they are covering, hair dye is absorbed into the hair follicles upon which it is applied. This creates challenges in maintaining the color of the hair dye after its application, in comparison to before its application, since the hair follicles themselves have their own original color, as well as other hair characteristics that may influence how the color is absorbed. These hair characteristics may include, by way of example only, and not by way of limitation, hair thickness, coarseness, porosity, damage (from previous hair treatments or the environment), and the like.

Additionally, hair dye mixtures and the hair dyeing process are volatile. This volatility is expressed through the use of developers that act as a catalyst to activate the hair dye mixture components before their application to the hair follicles for coloring. The activation begins quickly so the hair dye mixture must be used immediately or the mixture will become unusable. As such, a hair dye mixture that has had its developer added may not be saved for later use. This volatility makes the field of hair dye technology distinct from other fields paint and ink where no such volatility is present. This volatility that is imparted by the use of developers also presents unique challenges in maintaining the consistency of the intended color application since the activation provided by the developers will change over time, starting immediately after the hair dye components are mixed.

Furthermore, the use of developers in hair dye mixtures results in a chemical reaction occurring when a hair dye mixture is blended. Again, this mixing process is unlike the mixing of other paints and inks that do not create a chemical reaction when they are mixed since. Other paint mixtures and ink mixtures do not include a developer that acts as a catalyst to activate a chemical reaction just prior to the application of a color mixture. The chemical reaction also presents unique challenges in maintaining the consistency of the intended color of the hair dye mixture since the chemical reaction affects the resulting color of the mixture of two or more colors.

In the hair dye industry, there is often the desire to duplicate a resultant hair color of a hair dye color mixture that was created using hair dye colors of a first hair dye color line using a different hair dye color mixture that was created using hair dye colors of a second hair dye color line. In some situations, the first and second hair dye line color lines will be from the same manufacture, while in other situations the first and second hair dye line color lines will be from different manufactures. The reasons for someone to want to use a second hair dye color line to duplicate the resultant hair color of a first hair dye product hair are numerous, but include, by way of example only, and not by way of limitation, running out of one or more of the components of a hair dye mixture in the first hair dye color line, moving to a new hair salon that does not carry the first hair dye mixture, the comparative cost of the first hair dye color line to the second hair dye color line, and the like.

For the reasons described above regarding volatility, the chemical reaction associated with the developers, and the effect of hair dye absorption in hair follicles, there are many difficulties associated with duplicating a resultant hair color from a hair dye color mixture that was created from hair dye colors of a first hair dye color line by instead using a different hair dye color mixture that was created using hair dye colors of a second hair dye color line.

Previous attempts to duplicate resultant colors of hair dye color mixtures involved merely visually inspecting (eyeballing) comparable color swatches to determine matching colors. Typically, this visual comparison matching was only performed for individual colors. The visual comparison matching was not attempted for hair dye color mixtures because this task is too complex for the naked eye. Additionally, the number of potential combinations could be overwhelmingly large without some type of limiting parameters.

Mathematical systems exist for defining colors in a variety of ways. In this regard, a color space is specific organization of colors. A color space may be arbitrary, with particular colors assigned to a set of physical color swatches and corresponding assigned names or numbers such as the Pantone collection. Alternatively, a color space may be structured mathematically such as with the NCS system, Adobe RGB, or RGB. Thus, a color space may allow for representations of color in mathematic values.

A color model (or color matrix) is abstract mathematical model describing the way colors may be represented and graphically presented. However, a color matrix without an associated mapping to an absolute color space is basically an arbitrary color system with no connection to any globally understood system of color interpretation. Thus, mapping a color matrix to a color space establishes the reference color space. For example, Adobe RGB and RGB are two different absolute color spaces that are both based on the RGB color matrix.

The CIELAB and CIEXYZ color spaces are reference standards that were specifically designed to encompass all colors the average human can see. The CIEXYZ color space was one of the first attempts to produce a color space based on measurements of human color perception. It is the basis for most other color spaces. The CIERGB color space is linearly-related to the CIEXYZ color space. Other derivatives of the CIEXYZ color space include CIELUV, CIEUVW, and CIELAB. Colors can be created in color spaces based on the RGB color model using the primary colors (red, green, and blue). A three-dimensional representation can be made that assigns each of the three colors to the X, Y, and Z axes.

There is a continuing need to provide a way to duplicate a resultant hair color from a hair dye color mixture that was created using hair dye colors of a first hair dye color line using a different hair dye color mixture that was created using hair dye colors of a second hair dye color line.

BRIEF SUMMARY

Briefly, and in general terms, a method is disclosed for hair dye color conversion in which a hair dye color mixture of one manufacture is matched and reproduced using a hair dye color mixture of an another manufacture.

A method for hair dye color conversion in which a hair dye color mixture of one manufacture is matched and reproduced using a hair dye color mixture of an another manufacture, may be summarized as including accessing a control system having at least a processor, a memory, and user input controls, the memory configured to store ingredients of a hair dye color mixture, each ingredient of the hair dye color mixture being from a first manufacturer color line; receiving user input from the user input controls to change one or more ingredients of the hair dye color mixture from the first manufacturer color line to one or more second manufacturer color lines; converting the mathematical RGB data of the multiple hair dye colors for the first manufacturer color line into a product matrix that accounts different hair dye color percentages in the hair dye color mixture; applying a transformation to RGB values to the mathematical RGB data of the multiple hair dye colors for the first manufacturer color line, wherein the transformation is a modified Kubelka-Munk transformation; multiplying the modified KM transformed values of the multiple hair dye colors for the first manufacturer color line by their respective percentages and then summing them; retransforming the summed modified KM transformed values of the multiple hair dye colors back into mathematical RGB values in the original RGB color space; applying a correction factor to the retransformed mathematical RGB values that corrects for RGB errors, wherein the correction factor employs a regression algorithm; determining multiple hair dye colors of the second manufacturer color line that combine to create the retransformed mathematical RGB values for the hair dye color mixture in the one or more second manufacturer color lines; and displaying, via a display, a confirmation message that the hair dye color mixture in the one or more second manufacturer color lines has been determined. The correction factor may estimate product color adjustments using a Huber regression. The correction factor may employ a regression algorithm that reduces influences of outlier data points. The outlier data points may be identified by optimizing a threshold for differences between observed and predicted values. The correction factor may estimate a color factor matrix using a ridge regression. The correction factor may employ a regression algorithm with L2 regularization to penalize large coefficients.

The method may further include employing machine learning and linear regression to improve color prediction accuracy. The method may further include predicting a color of a color mixture in a first formula product line; and identifying a formula in a second product line that matches the predicted color in the first formula product line. The method may further include multiplying a product factor matrix by a base color factor matrix to obtain RGB error predictions; and adding the RGB error predictions to a baseline RGB prediction to obtain a final prediction. The method may further include using a linear regression to identify an amount of bias for each file that minimizes difference between baseline predictions and observed dye-out values; and applying a correction factor to remove the identified bias.

A method for hair dye color conversion in which a hair dye color mixture of one manufacture is matched and reproduced using a hair dye color mixture of an another manufacture, may be summarized as including accessing color scanning analysis of multiple hair dye colors of a first manufacturer color line from color swatches post dye-out to obtain mathematical RGB data for each of the multiple hair dye colors, wherein the mathematical RGB data is in an original RGB color space; converting the mathematical RGB data of the multiple hair dye colors for the first manufacturer color line into a product matrix that accounts different hair dye color percentages in the hair dye color mixture; applying a transformation to RGB values to the mathematical RGB data of the multiple hair dye colors for the first manufacturer color line, wherein the transformation is a modified Kubelka-Munk transformation; multiplying the modified KM transformed values of the multiple hair dye colors for the first manufacturer color line by their respective percentages and then summing them; retransforming the summed modified KM transformed values of the multiple hair dye colors back into mathematical RGB values in the original RGB color space; applying a correction factor to the retransformed mathematical RGB values that corrects for RGB errors, wherein the correction factor employs a regression algorithm; and determining multiple hair dye colors of a second manufacturer color line that combine to create the retransformed mathematical RGB values for the hair dye color mixture in the second manufacturer color line. The correction factor may estimate product color adjustments using a Huber regression. The correction factor may employ a regression algorithm that reduces influences of outlier data points. The outlier data points may be identified by optimizing a threshold for differences between observed and predicted values. The correction factor may estimate a color factor matrix using a ridge regression. The correction factor may employ a regression algorithm with L2 regularization to penalize large coefficients.

The method may further include employing machine learning and linear regression to improve color prediction accuracy. The method may further include predicting a color of a color mixture in a first formula product line; and identifying a formula in a second product line that matches the predicted color in the first formula product line. The method may further include multiplying a product factor matrix by a base color factor matrix to obtain RGB error predictions; and adding the RGB error predictions to a baseline RGB prediction to obtain a final prediction. The method may further include using a linear regression to identify an amount of bias for each file that minimizes difference between baseline predictions and observed dye-out values; and applying a correction factor to remove the identified bias.

A hair dye color conversion system in which a hair dye color mixture of one manufacture is matched and reproduced using a hair dye color mixture of another manufacture, may be summarized as including one or more processors; an input device that enables a user to input hair dye color information into the system; and a memory device storing a set of instructions that when executed by the one or more processors, causes the one or more processors to access color scanning analysis of multiple hair dye colors of a first manufacturer color line from color swatches post dye-out to obtain mathematical RGB data for each of the multiple hair dye colors, wherein the mathematical RGB data is in an original RGB color space; convert the mathematical RGB data of the multiple hair dye colors for the first manufacturer color line into a product matrix; apply a transformation to RGB values to the mathematical RGB data of the multiple hair dye colors for the first manufacturer color line, wherein the transformation is a modified Kubelka-Munk transformation; multiply the modified KM transformed values of the multiple hair dye colors for the first manufacturer color line by their respective percentages and then summing them; retransform the summed modified KM transformed values of the multiple hair dye colors back into mathematical RGB values in the original RGB color space; apply a correction factor to the retransformed mathematical RGB values that corrects for RGB errors, wherein the correction factor employs a regression algorithm; and determine multiple hair dye colors of a second manufacturer color line that combine to create the retransformed mathematical RGB values for the hair dye color mixture in the second manufacturer color line. The set of instructions stored in the memory device may be wrapped in an application program interface (API). The API may call the set of instructions, add a developer, create a new formula, and add the formula to a list of available formulas for the users.

These features with other technological improvements, which will become subsequently apparent, reside in the details of construction and operation as more fully described hereafter and claimed, reference being had to the accompanying drawings forming a part hereof.

BRIEF DESCRIPTION OF THE SEVERAL VIEWS OF THE DRAWINGS

The present application will be more fully understood by reference to the following figures, which are for illustrative purposes only. The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims:'

FIG. 2B is one implementation of a logic flow diagram that shows the conversion of a hair dye mixture made with hair dye components from a first manufacture color line to a duplicated hair dye mixture made with hair dye components from a second manufacture color line.

DETAILED DESCRIPTION

Figure 1:
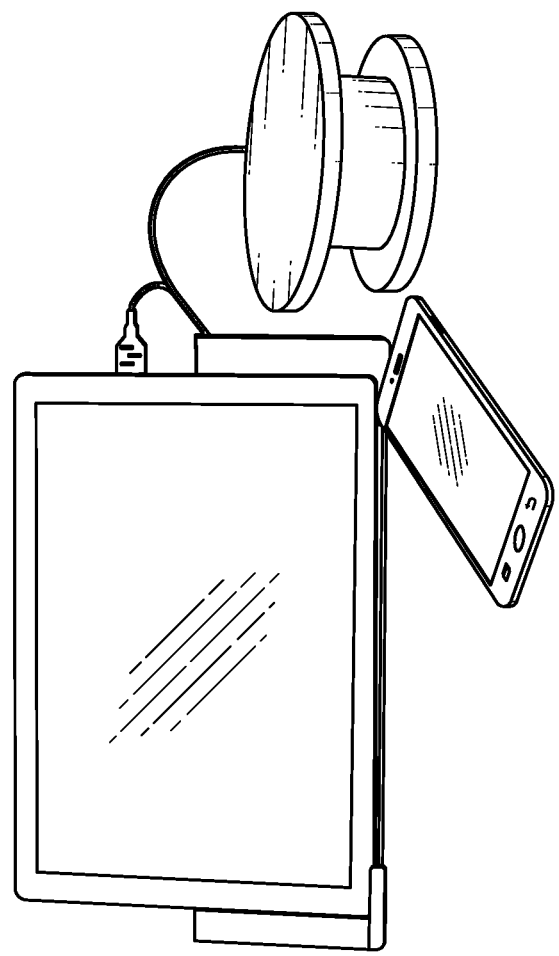
FIG. 1 is a perspective view of one embodiment of a hair dye color conversion system and method showing the user interface and associated scale.
Figure 1:
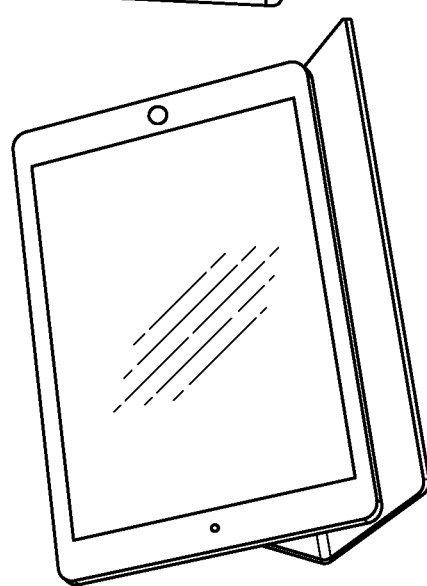

Persons of ordinary skill in the art will understand that the present disclosure is illustrative only and not in any way limiting. Other embodiments and various combinations of the presently disclosed system and method readily suggest themselves to such skilled persons having the assistance of this disclosure.

Each of the features and teachings disclosed herein can be utilized separately or in conjunction with other features and teachings to provide a system and method for duplicating a resultant hair color from a hair dye color mixture by converting hair dye colors of a first hair dye color line to hair dye colors of a second hair dye color line. Representative examples utilizing many of these additional features and teachings, both separately and in combination, are described in further detail with reference to attached FIGS. 1-6. This detailed description is intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm, as described herein, is a sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," "configuring," or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present application also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk, including floppy disks, optical disks, CD ROMs, and magnetic optical disks, read only memories (ROMs), random access memories (RAMs), EPROMs, EEPROMs, magnetic or optical cards, or any type of media suitable for storing electronic instructions, and each coupled to a computer system bus.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

As described herein, an embodiment is shown of the hair dye color conversion system and method 100. More specifically, the disclosed system and method duplicates a resultant hair color from a hair dye color mixture that was created using a first group of hair dye colors from a first hair dye color line using a different hair dye color mixture that was created using a second group of hair dye colors from a second hair dye color line. The hair dye color conversion system and method 100 uses dye-out color swatches made of bleached Yak hair as the medium to receive a hair dye color or hair dye color mixtures. In other implementations, other color mediums may be used instead of bleached Yak hair. As such, the hair dye color conversion system and method 100 examines physical reflected light from applied, developed, and dried hair dye. The hair dye color from the dried dye-out color swatches is significantly different in color from the pre-dye-out color of the hair dyes.

The system and method for hair dye color conversion creates dye-out color swatches for every color in a first manufacturer color line. The system and method for hair dye color conversion then performs color scanning analysis of all of the dye-out swatches. The color scanning analysis of the dye-out color swatches generates mathematical values for the individual hair dye colors using a selected color space (e.g., RGB) which is mapped onto a hair dye color matrix for the first manufacturer color line.

Next, the system and method for hair dye color conversion creates dye-out color swatches for every hair dye color in a second manufacturer color line. Again, the system and method for hair dye color conversion then performs color scanning analysis of all of the dye-out color swatches. Continuing, the color scanning analysis of the dye-out color swatches generates mathematical values for the colors using a selected color space (e.g., RGB) which can be mapped on a hair dye color matrix for the second manufacturer color line.

If the mathematical values in the selected color space for a hair dye color in the first manufacturer color line match the mathematical values in the selected color space for a single hair dye color in the second manufacturer color line, then a single color conversion from the first manufacturer color line to the second manufacturer color line may be mathematically verified. This mathematical verification by the system and method for hair dye color conversion is approximately a 99% match. The mathematical verification produced by the hair dye color conversion system and method 100 is far superior to prior color matching techniques that merely involve visual comparing colors from different manufacturer color lines with the naked eye (eye balling for matching color). By comparison, visual comparison matching only produces results that when mathematically analyzed are only approximately an 80% match, depending on the individual performing the visual comparison. This 80% match value may vary +/−10% depending upon the individual performing the visual comparison.

Notably, the technique of visual comparing colors from different manufacturer color lines with the naked eye has many deficiencies. For example, different people naturally have different levels of ability to distinguish color due to genetics. Additionally, the surrounding lighting (both natural and artificial), as well as the surrounding colors in a user's field of view, can affect how an individual perceives a color. Since the hair dye color conversion system and method 100 assigns mathematical values to hair dye color via color scanning analysis of radiative energy as a function of wavelength of the reflected physical color, the above color identification problems associated with basic visual identification are overcome by the hair dye color conversion system and method 100.

However, since typically most colors in a first manufacturer color line do not have matching mathematical values to hair dye colors in a second manufacturer color line, hair dye color combinations (e.g., hair dye color mixtures) are needed in order to create matching mathematical values to hair dye colors in other manufacturer color lines. Accordingly, the system and method for hair dye color conversion enables hair dye color combinations to be mathematically added together and the resultant mathematical values for the predicted hair color mixtures to be mapped to a color matrix. In one embodiment, the system and method for hair dye color conversion mathematically generates two-color combinations with color component percentages of, by way of example only, and not by way of limitation: 50/50, 30/70, 40/60, 60/40, 70/30, and the like. In another aspect, the system and method for hair dye color conversion mathematically generates three-color combinations with color component percentages of, by way of example only, and not by way of limitation: 33/33/33, 50/25/25, 25/50/25, 25/25/50, and the like. In other embodiments, the system and method for hair dye color conversion mathematically generates hair dye color combinations with different color component percentages and/or large number of colors.

Significantly, the resultant color of dye-out swatches from actual hair dye color combinations (e.g., 30% of color A, and 70% of color B) is not the same as the resultant color that would be anticipated (from the corresponding predictive mathematical values) by adding the RGB data from each color in the hair dye mixture with matching color component percentages (e.g., 30% of color A, and 70% of color B). Accordingly, the hair dye color conversion system and method 100 creates dye-out swatches for two-color combinations in the first manufacturer color line, and three-color combinations in the first manufacturer color line, which correspond to the component percentages in the color combinations of the predictive mathematical values discussed above. Next, the system and method for hair dye color conversion performs a color analysis of the dye-out swatches for the various color combinations to determine the actual mathematical values for the new color mixtures.

In other aspects, the hair dye color conversion system and method 100 converts a particular formula from one brand of product to another brand of product. For example, if a particular mixture of colors in one brand needs to be duplicated for a different brand, the particular ingredients will be different. The hair dye color conversion system and method 100 enables an operator to recreate the hair dye mixture using different branded products. These may be different branded products from the same manufacture or different branded products from the different manufactures.

Prediction Modelling

In some implementations, the system and method for hair dye color conversion employs formulas to predict and model the color values of color mixtures. The system and method for hair dye color conversion transforms the RGB dye-out values and predicts how the mixtures will behave optically. The RGB transformation used in some implementations is a variation of a Kubelka-Munk (KM) transformation. Additionally, the system and method for hair dye color conversion converts hair dye formulas to product matrices. In various embodiments of predictive modeling, the system and method for hair dye color conversion generates baseline predictions, adjusts product color estimates, and adds product factor to baseline predictions.

In another aspect of the system and method for hair dye color conversion, the system employs machines learning and linear regression to improve the accuracy of the prediction modelling. In some embodiments, a Huber regression is the type of regression used by the system. In other embodiments, a ridge regression is the type of regression used by the system. In one or more implementations, the system and method for hair dye color conversion predicts the color of the first formula product line and then looks up formulas in a second product line to match the predicted color in the first formula product line.

In another aspect of some implementations, the system and method for hair dye color conversion incorporates a predictive modeling process that includes the following: (1) convert data to product matrix, (2) apply transformation to RGB values (e.g., modified Kubelka-Munk Transformation), (3) correct for process-level biases, and (4) apply a regression algorithm to correct RGB errors. In some product color adjustment embodiments, the system and method estimates product color adjustments using a Huber regression. In some product factor embodiment, the system and method estimates a base color factor matrix using a ridge regression.

In some implementations of the system and method for hair dye color conversion, the transformation applied to RGB values is a variation of a modified Kubelka-Munk (KM) transformation. In one or more such implementations, for each product or formula there is a dye-out color in RGB values. For example, for Wella Koleston Perfect 'Formula 51', which is one part "12/1 Special Blonde/Ash" combined with one part "5/4 Light Brown/Red":

Product1: 12/1 Special Blonde/Ash: [163.5, 152.75, 147.25]
Product2: 5/4 Light Brown/Red: [99, 72.25, 51.25]
Dye-Out Color: [116.0, 89.0, 67.5]

While a traditional user might attempt to estimate dye-out color resulting from mixing these two products by averaging their RGB values, this is not accurate (% dRGB distance 9.59)

Original Prediction=(Product1+Product2)/2=[131.25, 112.5,99.25]

The system and method for hair dye color conversion produces superior outcomes for the resulting color by first applying a modified Kubelka-Munk (KM) transformation to each value and then averaging them. The variation of a modified KM transformation employed by the system and method for hair dye color conversion appears as follows:

$$f_{rgb\,to\,km}(\text{value}_{RGB}) = \frac{(1-\text{value}_{RGB})^2}{2\times\text{value}_{RGB}} = \text{value}_{KM}$$

Applying the modified KM transformation, the system provides the following values:

Product1_km=[0.1,0.13,0.15]

Product2_k=[0.48,0.91,1.59]

It will be appreciated that large RGB values become small after the modified KM transformation, and small RGB values become large afterwards after the modified KM transformation. The system and method for hair dye color conversion then averages the modified KM transformed values to produce the formula:

Prediction=(Product1_km+Product2_km)/2=[0.29, 0.52,0.87]

Next, the system and method for hair dye color conversion transforms this data back into the original RGB color space by reversing the modified KM transformation with the following formula:

$$f_{km\,to\,rgb}(\text{value}_{KM})=1+\text{value}_{KM}-\sqrt{\text{value}_{KM}^2+2\times\text{value}_{KM}}=\text{value}_{RGB}$$

Applying this formula to the outcome generated by the system and method for hair dye color conversion, produces the following result, with a % dRGB distance of 2.37:

Modified KM Prediction=[120.97,95.67,73.84]

In addition to being more accurate, this outcome generated by the system and method for hair dye color conversion is also darker (has lower RGB values) than the original prediction, which is consistent with darker dyes (products) having a larger effect on the resulting color.

Notably, this implementation of the system and method for hair dye color conversion uses a modified form of the KM transformation. The traditional KM transformation related to the behavior of light in paint mixtures of varying thicknesses and multiple layers, as well as both surface and internal reflectance of the medium. In contrast, this modified KM transformation of the system and method for hair dye color conversion has been implemented to predictively model a single layer of a hair dye mixture, as well as activators or oxidizers, such as ammonia. Accordingly, there are significant differences between the modified KM transformation of the system and method for hair dye color conversion and a traditional KM transformation.

Product Matrices

In another aspect of the system and method for hair dye color conversion, the formulas are converted into product matrices. For example, in the embodiment described above, two hair dye products were combined with equal part numbers. In other embodiments, when the system and method for hair dye color conversion combines two or more products, or products with different amounts, the system encodes the formulas as product matrices. The formula data is initially a table with one formula per row, with the product and part numbers specified in each row. For example, here are three formulas from the Redken Color Fusion product line:

Formulas with Product and Part Numbers

| FormulaName | Product1 | Product2 | Part1 | Part2 |
|---|---|---|---|---|
| CF11: 10AB-6GB | 10AB ASH BLUE-CF | 6GB GOLD BEIGE-CF | 1 | 1 |
| CF12: 10GV-6GB | 10GV Gold Violet | 6GB GOLD BEIGE-CF | 1 | 1 |
| CF13: 3BR-6N | 3BR BRWN RED-CF | 6N NEUTRAL-CF | 1 | 1 |

In this non-limiting example of the system and method for hair dye color conversion, additional data is present in this data table but not shown for clarity, such as product IDs, RGB scan data, process, and source file information. This formula data is converted to a product matrix where each product gets its own column, and the part amounts for a given formula are in their respective columns. Part amounts are adjusted so that they add up. For example:

Formulas as Product Matrix

| FormulaName | 10AB ASH BLUE-CF | 10GV Gold Violet | 3BR BRWN RED-CF | 6GB GOLD BEIGE-CF | 6N NEUTRAL-CF |
|---|---|---|---|---|---|
| CF11: 10AB-6GB | 0.5 | 0 | 0 | 0.5 | 0 |
| CF12: 10GV-6GB | 0 | 0.5 | 0 | 0.5 | 0 |
| CF13: 3BR-6N | 0 | 0 | 0.5 | 0 | 0.5 |

This method of representing the data enables application of a variety of models to the dataset in the system and method for hair dye color conversion. In another example, the system and method for hair dye color conversion generates a prediction using the actual dye-out color for each product. This predicted outcome of one embodiment of the system and method for hair dye color conversion serves as a baseline to determine if other embodiments of the system and method for hair dye color conversion generate better results.

The baseline model of the system uses the KM transformation and the product matrices discussed above. For the products in the product matrix example, the system uses the following dye-out RGB values for the individual products:

| Product | R | G | B |
|---|---|---|---|
| 10AB ASH BLUE-CF | 174.75 | 162.50 | 146.50 |
| 10GV Gold Violet | 156.50 | 132.75 | 114.75 |
| 3BR BRWN RED-CF | 61.00 | 42.25 | 39.00 |
| 6GB GOLD BEIGE-CF | 91.50 | 74.75 | 49.50 |
| 6N NEUTRAL-CF | 81.75 | 69.00 | 51.00 |

The system then applies the KM transformation to these values, resulting in the following array:

| Product | R_km | G_km | B_km |
|---|---|---|---|
| 10AB ASH BLUE-CF | 0.07 | 0.10 | 0.16 |
| 10GV Gold Violet | 0.12 | 0.22 | 0.34 |
| 3BR BRWN RED-CF | 1.21 | 2.10 | 2.35 |
| 6GB GOLD BEIGE-CF | 0.57 | 0.85 | 1.67 |
| 6N NEUTRAL-CF | 0.72 | 0.98 | 1.60 |

The system and method for hair dye color conversion then multiplies the Product Matrix created earlier by the Base Color Matrix to obtain predictions for each formula. The system and method for hair dye color conversion then converts the data back from KM transformed values into the RGB predictions for each formula:

$$KM \text{ Predictions} = \text{Product Matrix} \times \text{Base Color Matrix}$$

$$RGB \text{ Predictions} = f_{km \text{ to } rgb}(KM \text{ Predictions})$$

This calculation by the system and method for hair dye color conversion generates the following predictions:

| FormulaName | R | G | B | dE |
|---|---|---|---|---|
| CF11: 10AB-6GB | 116.54 | 99.39 | 71.86 | 6.77 |
| CF12: 10GV-6GB | 113.34 | 94.34 | 68.15 | 2.60 |
| CF13: 3BR-6N | 69.74 | 52.27 | 44.18 | 2.93 |

These were the actual dyed-out values:

| FormulaName | R_true | G_true | B_true |
|---|---|---|---|
| CF11: 10AB-6GB | 97.00 | 80.75 | 56.0 |
| CF12: 10GV-6GB | 105.25 | 87.50 | 62.0 |
| CF13: 3BR-6N | 72.00 | 50.25 | 45.0 |

Product Color Estimate Adjustment Embodiment

This product color estimate adjustment embodiment of the system and method for hair dye color conversion estimates new values for the Base Color Matrix in view of the observed data. Specifically, the system and method for hair dye color conversion model estimates these new values using a modified Huber regression algorithm. This modified Huber regression is a type of linear regression that identifies data points that are outliers and reduces the influence of the outliers on the final model. Outliers are identified by optimizing a threshold for the difference between observed and predicted values. Other sub-optimal techniques include decision tree based methods, neural networks, nearest neighbor based methods, support vector machines, Gaussian processes, and other types of linear regression. The modified Huber regression implementation of the system and method for hair dye color conversion is significantly more accurate than the other techniques discussed above.

In one or more implementations of the system and method for hair dye color conversion, the new base color estimates is then transformed using the modified KM prediction and multiplied by the product matrix to generate predictions. For example, in one implementation, the estimated colors for the example products are as follows product color estimate adjustment embodiment:

| Product | R | G | B |
|---|---|---|---|
| 10AB ASH BLUE-CF | 169.88 | 150.27 | 127.70 |
| 10GV Gold Violet | 154.62 | 129.18 | 106.65 |
| 3BR BRWN RED-CF | 62.56 | 43.74 | 39.40 |
| 6GB GOLD BEIGE-CF | 89.40 | 72.94 | 49.75 |
| 6N NEUTRAL-CF | 85.58 | 71.35 | 54.49 |

| Product | R_km | G_km | B_km |
|---|---|---|---|
| 10AB ASH BLUE-CF | 0.08 | 0.14 | 0.25 |
| 10GV Gold Violet | 0.13 | 0.24 | 0.40 |
| 3BR BRWN RED-CF | 1.16 | 2.00 | 2.31 |
| 6GB GOLD BEIGE-CF | 0.60 | 0.89 | 1.66 |
| 6N NEUTRAL-CF | 0.66 | 0.93 | 1.45 |

These new estimates are then used to generate predictions:

Modified *KM* Predictions=Product Matrix×Estimated Base Color Matrix

Model *RGB* Predictions=$f_{km\ to\ rgb}$(Modified *KM* Predictions)

This generates the following improved predictions:

| FormulaName | R | G | B | dE |
|---|---|---|---|---|
| CF11: 10AB-6GB | 113.92 | 95.94 | 70.17 | 5.17 |
| CF12: 10GV-6GB | 111.20 | 92.05 | 67.07 | 1.71 |
| CF13: 3BR-6N | 72.13 | 54.07 | 45.70 | 2.47 |

Add Product Factor to KM Prediction Embodiment

The product factor embodiment of the system and method for hair dye color conversion differs from product color estimate adjustment embodiment of the system and method for hair dye color conversion, in that instead of predicting new colors for the base dye-outs in the product color estimate adjustment embodiment, the product factor embodiment estimates RGB values to add to the baseline prediction based on which products are in the formula. This product factor embodiment of the system and method for hair dye color conversion enables corrections to be small additions or subtractions, instead of large changes in the estimate for the base color. Notably, the product factor embodiment is dependent on having all base color dye-outs.

The product factor embodiment of the system and method for hair dye color conversion begins by generating modified KM predictions as in the baseline model:

Modified *KM* Predictions=Product Matrix×Base Color Matrix

Baseline *RGB* Predictions=$f_{km\ to\ rgb}$(Modified *KM* Predictions)

The product factor embodiment then calculates the difference between observed and predicted RGB values:

*RGB* Error=Observed *RGB* values−Baseline *RGB* Predictions

The product factor embodiment of the system and method for hair dye color conversion then generates a Product Factor Matrix that indicates whether a product is in the formula or not (1 means the product is in the formula, 0 means it is not), for example:

Formulas as Product Factor Matrix

| FormulaName | 10AB ASH BLUE-CF | 10GV Gold Violet | 3BR BRWN RED-CF | 6GB GOLD BEIGE-CF | 6N NEUTRAL-CF |
|---|---|---|---|---|---|
| CF11: 10AB-6GB | 1 | 0 | 0 | 1 | 0 |
| CF12: 10GV-6GB | 0 | 1 | 0 | 1 | 0 |
| CF13: 3BR-6N | 0 | 0 | 1 | 0 | 1 |

The product factor embodiment estimates a Base Color Factor Matrix that fits these RGB Errors. This Base Color Factor Matrix is generated by fitting the Product Factor Matrix to the RGB Errors using a Ridge regression algorithm. Ridge regression is a type of linear regression that penalizes large coefficients (i.e., L2 regularization). This Base Color Factor Matrix for these products looks like, for example:

| Product | R_factor | G_factor | B_factor |
|---|---|---|---|
| 10AB ASH BLUE-CF | −2.88 | −4.15 | −3.59 |
| 10GV Gold Violet | −0.35 | −1.89 | −3.10 |
| 3BR BRWN RED-CF | 1.96 | 1.36 | 1.27 |
| 6GB GOLD BEIGE-CF | −3.08 | −3.16 | −1.14 |
| 6N NEUTRAL-CF | 1.49 | 0.21 | 2.05 |

To generate predictions with this product factor embodiment, the system and method for hair dye color conversion multiplies the Product Factor Matrix by the Base Color Factor Matrix to obtain RGB Error Predictions. The system and method for hair dye color conversion then adds these error predictions to the baseline RGB prediction to obtain the final prediction:

*RGB* Error Predictions=Product Factor Matrix×Base Color Factor Matrix

Model *RGB* Prediction=Baseline *RGB* Predictions+*RGB* Error Predictions

The Baseline RGB Predictions as initially generated are as follows:

| FormulaName | R | G | B | dE |
|---|---|---|---|---|
| CF11: 10AB-6GB | 116.54 | 99.39 | 71.86 | 6.77 |
| CF12: 10GV-6GB | 113.34 | 94.34 | 68.15 | 2.60 |
| CF13: 3BR-6N | 69.74 | 52.27 | 44.18 | 2.93 |

The product factor embodiment of the system and method for hair dye color conversion then generates RGB error estimates based on the product factors of the products in each formula:

| FormulaName | R_est | G_est | B_est |
|---|---|---|---|
| CF11: 10AB-6GB | −5.96 | −7.30 | −4.74 |
| CF12: 10GV-6GB | −3.43 | −5.05 | −4.24 |
| CF13: 3BR-6N | 3.46 | 1.57 | 3.31 |

Next, the product factor embodiment of the system and method for hair dye color conversion adds the RGB error estimates to the baseline predictions. This yields the following predictions:

| FormulaName | R | G | B | dE |
|---|---|---|---|---|
| CF11: 10AB-6GB | 110.58 | 92.08 | 67.12 | 4.31 |
| CF12: 10GV-6GB | 109.91 | 89.29 | 63.91 | 1.68 |
| CF13: 3BR-6N | 73.20 | 53.84 | 47.49 | 1.71 |

The product factor embodiments of the system and method for hair dye color conversion are superior to other embodiments that employ alternative modeling algorithms. Specifically, the product factor embodiments of the system and method for hair dye color conversion employ ridge regression with presence/absence product factors added to the RGB values. The product factor embodiments of the system and method for hair dye color conversion are also superior to embodiments that employ other product factor matrix encoding techniques, including with part amount information, or using level and tone instead of or in addition to product names. Additionally, the product factor embodiments of the system and method for hair dye color conversion are superior to embodiments that employ multiplication and exponentiation instead of addition for product factors determination. Furthermore, the product factor embodiments of the system and method for hair dye color conversion are superior to embodiments that employ applying factors to KM transformed values instead of to RGB values.

Bias Corrections

In another aspect of the system and method for hair dye color conversion data was collected under varying conditions and protocols. Repeated dye-outs show consistent shifts between data files. In the absence of calibration data, the system and method for hair dye color conversion estimates the bias between different data files. This calibration is performed in a manner similar to product factor embodiments. Instead of having a factor for each product, the system and method for hair dye color conversion employs a factor for each data file. Is some embodiments, a linear regression is used to estimate the amount of bias for each file that minimizes the difference between baseline predictions and observed dye-out values. Since some data files have a small number of formulas, which could lead to over-estimates of bias with this calibration method, data files were grouped into file groups with at least 30 formulas in each file group.

Bias corrections are calculated before the Estimated Base Product Matrix is generated in product color estimate adjustment embodiment. In the product factor embodiments, the bias corrections are calculated at the same time as the Product Factors calibrations. Bias corrections are not included in baseline embodiments.

With respect to determining and applying bias corrections, RGB measurements from a recent dye-out mixture process are adjusted by (−7.53, −5.64, −2.04) to correct for apparent measurement differences (biases) compared to previous dye-out mixture processes. These biases are estimated using a linear model. Example bias corrections for each process may be seen in the following table:

| Process | R Bias | G Bias | B Bias |
|---|---|---|---|
| 1 | −0.26 | −0.29 | 0.43 |
| 2 | −17.34 | −16.3 | −9.98 |
| 3 | −25.76 | −19.4 | −14.51 |
| 4 | −2.59 | −2.96 | −1.7 |
| 4.5 | −7.53 | −5.64 | −2.04 |
| 5 | −2.53 | −4.26 | −3.73 |

% dRGB and CIELAB dE2000 Distance Metrics

The % dRGB distance is the Euclidean distance between two colors, $(R_1, G_1, B_1)$ and $(R_2, G_2, B_2)$ divided by the maximum possible distance between two RGB values (0, 0, 0 to 255, 255, 255).

$$\% \, RGB = \frac{\sqrt{(R_1 - R_2)^2 + (G_1 - G_2)^2 + (B_1 - B_2)^2}}{\sqrt{(255 - 0)^2 + (255 - 0)^2 + (255 - 0)^2}} = \frac{\|RGB_1 - RGB_2\|}{255 \times \sqrt{3}}$$

Referring now to the metrics that are used in embodiments of the system and method for hair dye color conversion, the CIELAB dE2000 distance metric is a more complex calculation which requires converting colors to the LAB color space and then calculating a distance that is adjusted based on the unique properties of human color vision. The dE metric was designed such that a dE of 1 is the minimum color difference perceptible to the human eye, assuming ideal conditions. In embodiments of the system and method for hair dye color conversion, the dE metric is the preferred measurement metric. The CIE dE2000 metric dE includes five correction factors: (1) A hue rotation term (RT), to address the problematic blue region, (2) Compensation for neutral colors, (3) Compensation for lightness (SL), (4) Compensation for chroma (SC), and (5) Compensation for hue (SH).

Figure 2A:
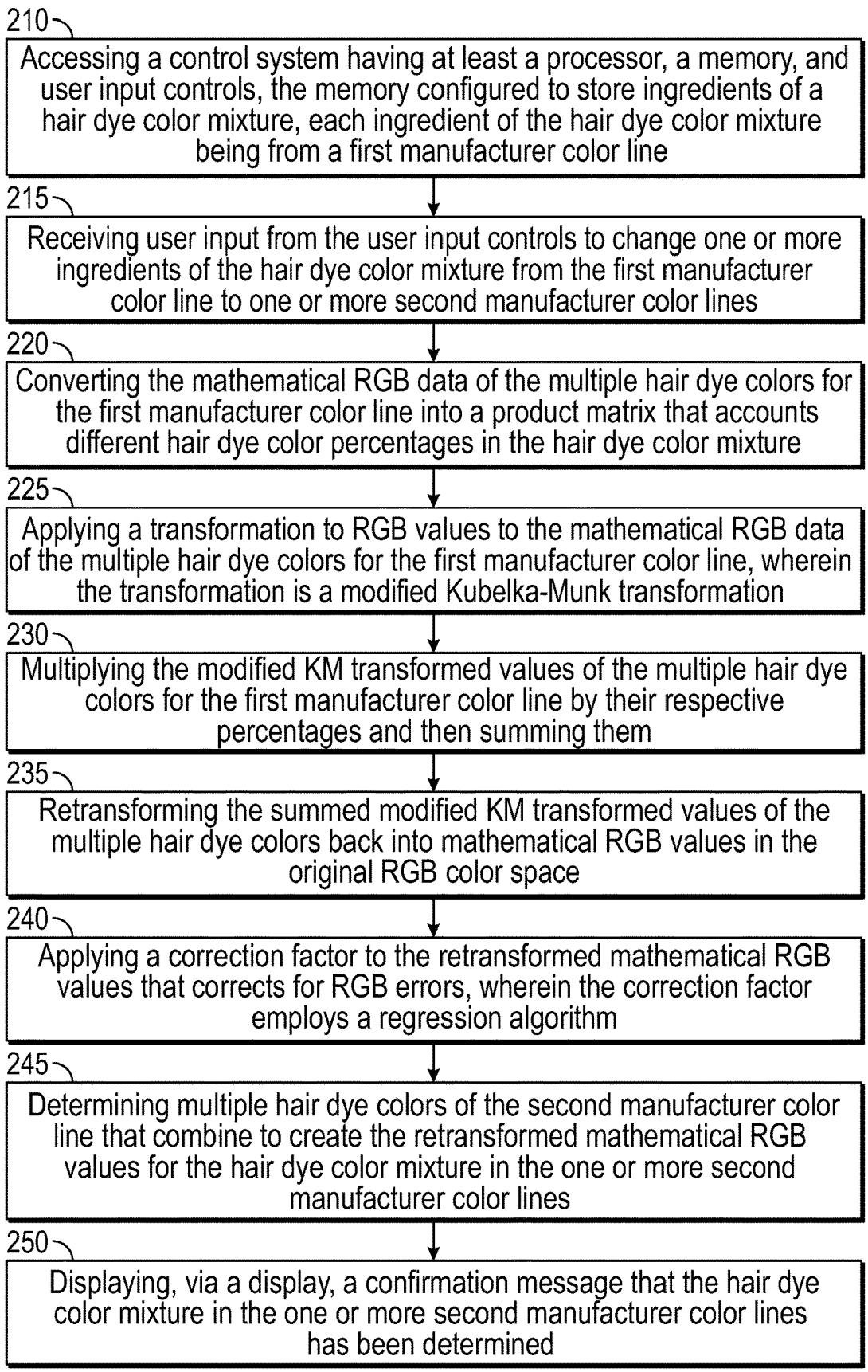
FIG. 2A is one implementation of a logic flow diagram that shows the conversion of a hair dye mixture made with hair dye components from a first manufacture color line to a duplicated hair dye mixture made with hair dye components from a second manufacture color line.
Figure 3A:
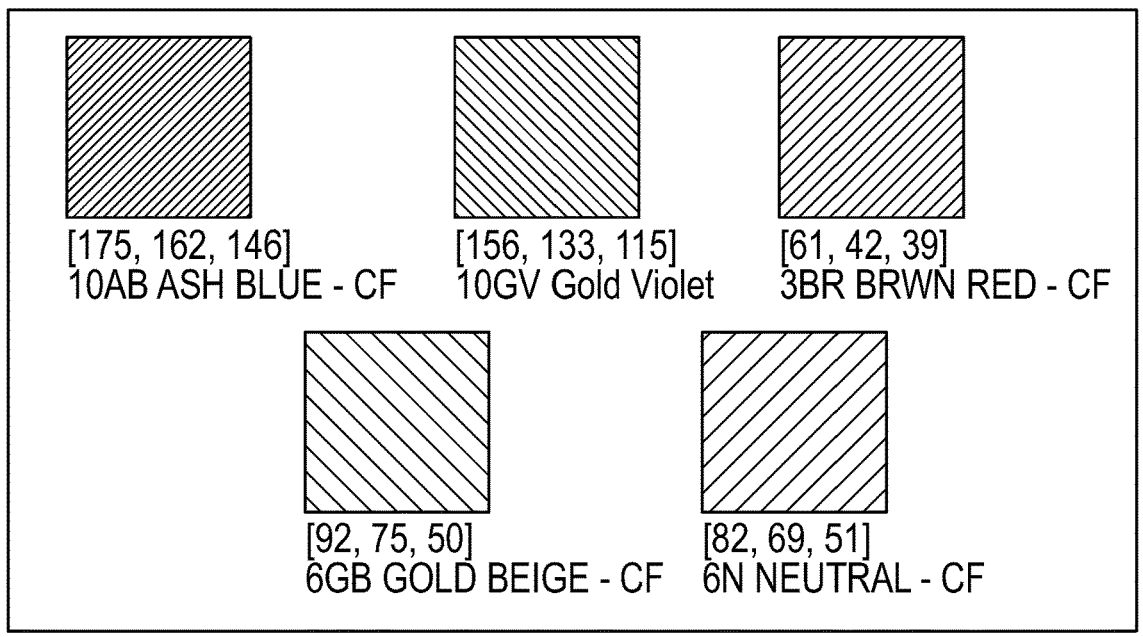
FIGS. 3A, 3B, and 3C are top views of color swatches employed in one embodiment of a hair dye color conversion system and method.
Figure 3B:
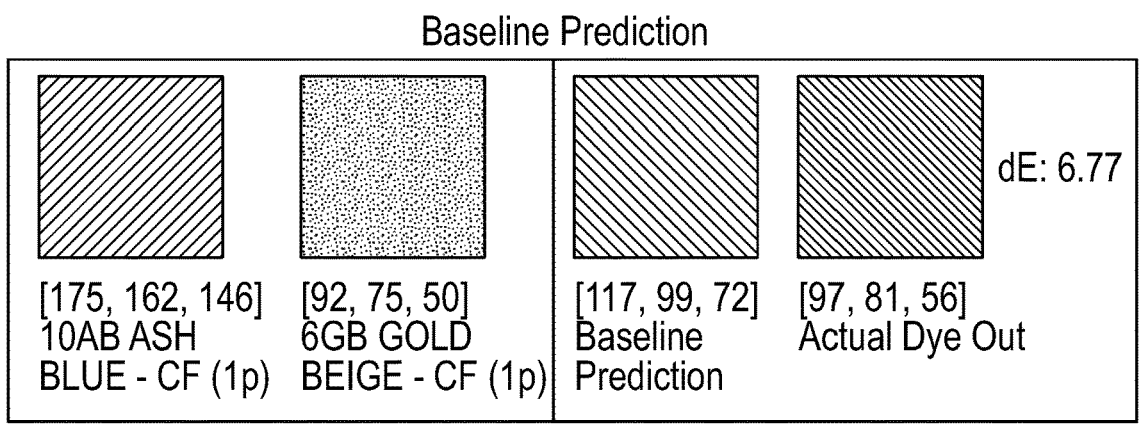
Figure 3C:
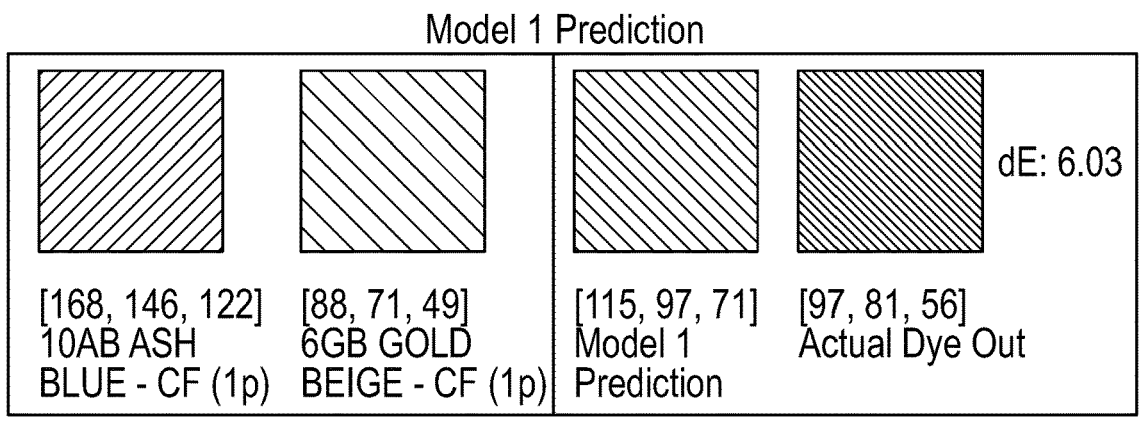

Referring now to FIG. 2A, a method for hair dye color conversion 200 is shown in which a hair dye color mixture of one manufacture is matched and reproduced using a hair dye color mixture of an another manufacture. The method includes, at 210, accessing a control system having at least a processor, a memory, and user input controls, the memory configured to store ingredients of a hair dye color mixture, each ingredient of the hair dye color mixture being from a first manufacturer color line. At 215, the method includes receiving user input from the user input controls to change one or more ingredients of the hair dye color mixture from the first manufacturer color line to one or more second manufacturer color lines. At 220, the method includes converting the mathematical RGB data of the multiple hair dye colors for the first manufacturer color line into a product matrix that accounts different hair dye color percentages in the hair dye color mixture. At 225, the method includes applying a transformation to RGB values to the mathematical RGB data of the multiple hair dye colors for the first manufacturer color line, wherein the transformation is a modified Kubelka-Munk transformation.

Next, at 230, the method includes multiplying the modified KM transformed values of the multiple hair dye colors for the first manufacturer color line by their respective percentages and then summing them. At 235, the method includes retransforming the summed modified KM transformed values of the multiple hair dye colors back into mathematical RGB values in the original RGB color space. At 240, the method includes applying a correction factor to the retransformed mathematical RGB values that corrects for RGB errors, wherein the correction factor employs a regression algorithm. At 245, the method includes determining multiple hair dye colors of the second manufacturer color line that combine to create the retransformed mathematical RGB values for the hair dye color mixture in the one or more second manufacturer color lines. Finally, at 250, the method includes displaying, via a display, a confirmation message that the hair dye color mixture in the one or more second manufacturer color lines has been determined.

Referring now to FIG. 2B, another method for hair dye color conversion 255 is shown in which a hair dye color mixture of one manufacture is matched and reproduced using a hair dye color mixture of an another manufacture. At 260, the method includes accessing color scanning analysis of multiple hair dye colors of a first manufacturer color line from color swatches post dye-out to obtain mathematical RGB data for each of the multiple hair dye colors, wherein the mathematical RGB data is in an original RGB color space. At 265, the method includes converting the mathematical RGB data of the multiple hair dye colors for the first manufacturer color line into a product matrix that accounts different hair dye color percentages in the hair dye color mixture. At 270, the method includes applying a transformation to RGB values to the mathematical RGB data of the multiple hair dye colors for the first manufacturer color line, wherein the transformation is a modified Kubelka-Munk transformation.

Continuing, at 275, the method includes multiplying the modified KM transformed values of the multiple hair dye colors for the first manufacturer color line by their respective percentages and then summing them. At 280, the method includes retransforming the summed modified KM transformed values of the multiple hair dye colors back into mathematical RGB values in the original RGB color space. At 285, the method includes applying a correction factor to the retransformed mathematical RGB values that corrects for RGB errors, wherein the correction factor employs a regression algorithm. At 290, the method includes determining multiple hair dye colors of the second manufacturer color line that combine to create the retransformed mathematical RGB values for the hair dye color mixture in the second manufacturer color line.

In one embodiment, the hair dye color conversion system and method 100 creates dye-out swatches for two-color combination with color component percentages of, by way of example only, and not by way of limitation: 50/50, 30/70, 40/60, 60/40, 70/30, and the like. In another embodiment, the system and method for hair dye color conversion creates three-color combination dye-out swatches with color component percentages of, by way of example only, and not by way of limitation: 33/33/33, 50/25/25, 25/50/25, 25/25/50, and the like. In other embodiments, color combination dye-out swatches are created with different color component percentages and/or a large number of colors. Alternately, in some embodiments a developer may be included as one of the "colors" in the hair dye color mixture.

In one or more implementations of the system and method for hair dye color conversion, bleached yak hair is dyed with individual products and then scanned to obtain RGB values representing the color of the hair. See FIG. 3A.

To predict the color of a formula using these products, the system and method for hair dye color conversion may begin by using classic dye-mixing theory to combine the RGB values. This generates a predicted color that the system and method for hair dye color conversion may compare to the actual dyed-out color of the formula. See FIG. 3B.

The system and method for hair dye color conversion measures the difference between the predicted and actual color of the formula using an industry standard metric, the CIELAB dE2000. The dE metric approximates the color differences as seen by the human visual system, such that a dE of ~1 is the smallest noticeable difference under ideal conditions.

In some implementations, the system and method for hair dye color conversion re-estimates base colors. Thus, in one or more embodiments of the system and method for hair dye color conversion the actual color of the individual products is estimate. Small variations in the dyeing and scanning process may have resulted in a base dye-out colors that are not accurate. Accordingly, the system and method for hair dye color conversion re-estimates the base color. See FIG. 3C.

Continuing, in another embodiment of the system and method for hair dye color conversion, product factors are added. In this embodiment of the system and method for hair dye color conversion, a fixed product factor is added to the baseline predictions. This product factor imitates the effects non-dye components have on the final dye-out color, such as variations in ammonia content in the products.

| Product | R_factor | G_factor | B_factor |
|---|---|---|---|
| 10AB ASH BLUE-CF | −2.88 | −4.15 | −3.59 |
| 10GV Gold Violet | −0.35 | −1.89 | −3.10 |
| 3BR BRWN RED-CF | 1.96 | 1.36 | 1.27 |
| 6GB GOLD BEIGE-CF | −3.08 | −3.16 | −1.14 |
| 6N NEUTRAL-CF | 1.49 | 0.21 | 2.05 |

In another aspect of the system and method for hair dye color conversion, the set of instructions stored in the memory device are wrapped in application program interface (API). In such as implementation, the API calls the set of instructions, adds a developer, creates a new formula, and adds the formula to a list of available formulas for users. In still another aspect of some implementations, the method for hair dye color conversion further includes displaying, via a display, a confirmation message that the hair dye color mixture in the one or more second manufacturer color lines has been determined.

In another embodiment, there is provided a hair dye color conversion system and method 100 that includes a control system having a memory, input controls, a display, and at least one formula stored in the memory. The formula defines instructions for selecting one or more colorants and/or dye blending materials, and amounts of each that are recommended for creating a hair dye mixture. Each colorant and/or blending material is separately identified with its manufacturer color line (e.g., product brand), such that brand selection software can be configured to receive a manual input from the input controls to change a colorant and/or blending material from a first product brand to a second product brand. Brand adjusting software may be configured to adjust the formula of the hair dye mixture from the first product brand to the second product brand in response to the manual input. The brand selection software may further be configured to receive a single manual input from the input control to change all of the colorant(s) and/or blending material(s) from the first product brand to a second product brand, such that the brand adjusting software adjusts the formula of the hair dye mixture from the first product brand to the second product brand in response to the manual input.

In one embodiment, brand conversion software may be configured to convert all of the formulas in a database from the colorant(s) and/or blending material(s) in a first product brand to the colorant(s) and/or blending material(s) in a second product brand. In this manner, the brand conversion software may convert all of the formulas in a database from the first product brand to the second product brand. In another embodiment, brand conversion software may be configured to convert a user-selected number of formulas (e.g., more than one formula but less than all of the formulas) in the database from the colorant(s) and/or blending material(s) in a first product brand to the colorant(s) and/or blending material(s) in a second product brand, thereby converting the user-selected number of formulas in the database from the first product brand to the second product brand.

Figure 4:
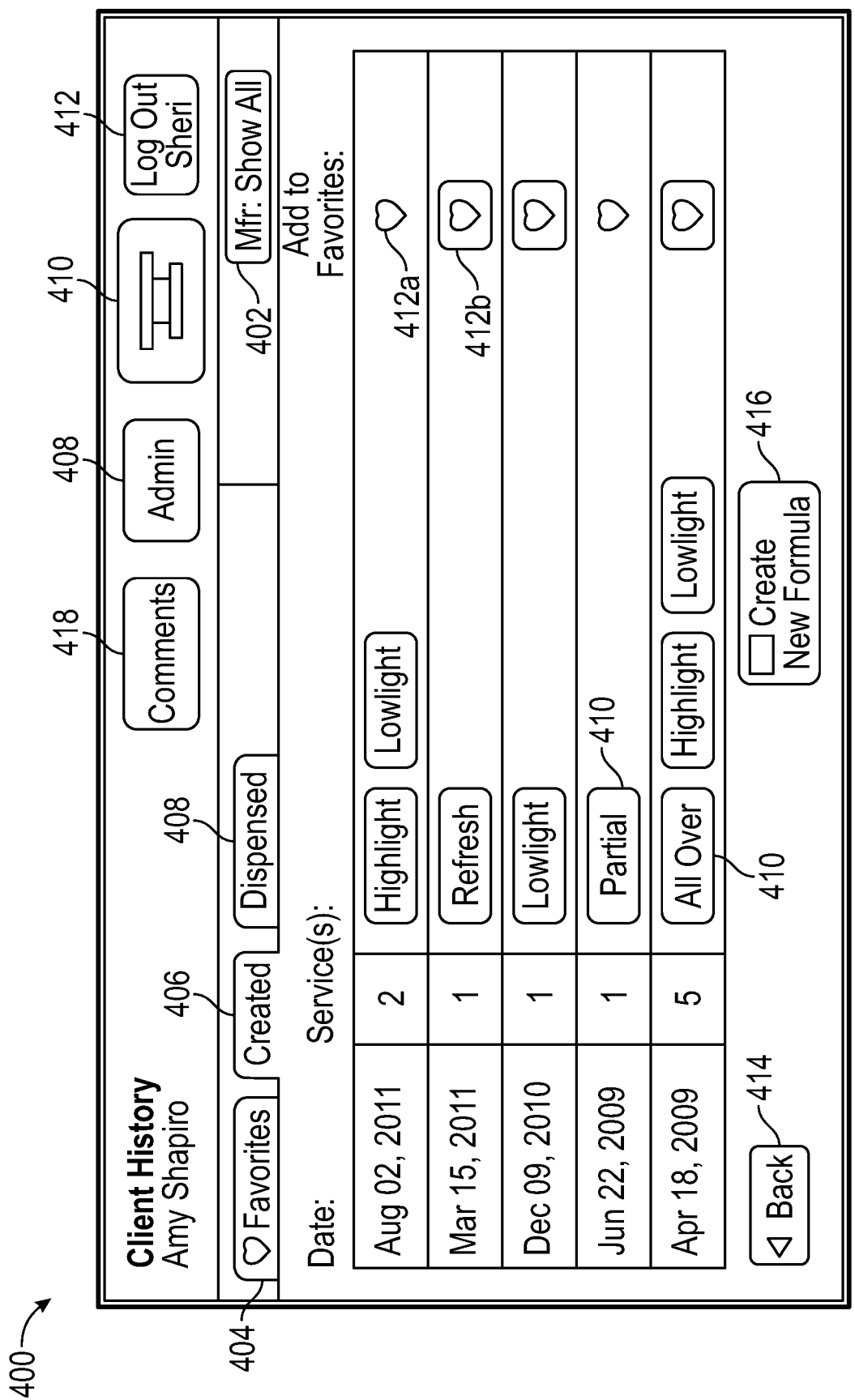
FIG. 4 depicts a screenshot of a client history screen associated with a client history GUI module according to one embodiment.

FIG. 4, depicts a screenshot of a client history screen 400 associated with the "Client History" GUI module according to one embodiment. As shown, the client history of the client "Amy Shapiro" is displayed. The client history screen 400 may include the virtual "Comments" key 468, the virtual "Administrator" key 458, the virtual "Scale" key 490, the virtual "Log-Out" key 462, a virtual "Manufacturer: Show All" key 402, a virtual "Favorites" tab 404, a virtual "Created" tab 406, a virtual "Dispensed" tab 408, various virtual service name keys 410, "Favorite" icons 412a, and "Non-Favorite" icons 412b, a navigational "Back" virtual key 414 that operates similarly to other navigational "Back" virtual keys described herein, and a virtual "Create New Formula" key 416.

As shown, the client history screen 400 has the "Created" tab 406 selected by default. Other embodiments may have a different tab selected as the default tab upon the user reaching the client history screen 400. The "Created" tab 406 may generally include a client's service history such as the dates on which the client came to the salon for one or more services, the number of services (e.g., formulas) created by the user on each service date, the products purchased by the client on each service date, the length of the service (s), whether or not the service was especially liked by the client (e.g., favorite), and the like. The "Dispensed" tab 408 may generally include a client's service history such as the dates on which the client came to the salon for one or more services, the number of services (e.g., formulas) dispensed by the user on each service date, the products purchased by the client on each service date, the length of the service(s), whether or not the service was especially liked by the client or the user (e.g., favorite), and the like.

Referring still to FIG. 4, the virtual "Manufacturer: Show All" key 402 may be set by default, as shown, to "Show All." In such an embodiment, the system and method for hair dye color conversion does not filter out any services listed on the client history screen 400 based on the manufacturer of any formula ingredients. Upon selecting the "Manufacturer: Show All" key 402, the system and method for hair dye color conversion may process the input to then display a pop-up window in the GUI presented on display 400. The pop-up window enables the user to select one or more manufacturers (e.g., JOHN FRIEDA®, JOICO®, and REDKEN®) from a list. The user may close the pop-up window by selecting a "Close" or "Done" virtual key. The system and method for hair dye color conversion then removes the pop-up window and only displays the services listed containing ingredients from the selected manufacturer(s).

When the user selects two or more manufacturers, the system and method for hair dye color conversion may view the selected manufacturers as conjunctive or disjunctive operands. For example, the user may select JOICO® and REDKEN® from a list of manufacturers. If the user's selections are conjunctive, both JOICO® and REDKEN® would have to be an ingredient manufacturer for an ingredient used in a formula for the service to be displayed on the client history screen 400. If the user's selections are disjunctive, only JOICO® or REDKEN® would have to be an ingredient manufacturer for an ingredient used in a formula for the service to be displayed on the client history screen 400. Is some embodiments, a pop-up window may enable the user to choose between an "AND" and "OR" operators. Upon selecting a service by touching one of the service name keys 410 on the client history screen 400, the GUI presented on display 400 may proceed to a selected formula screen.

Figure 5:
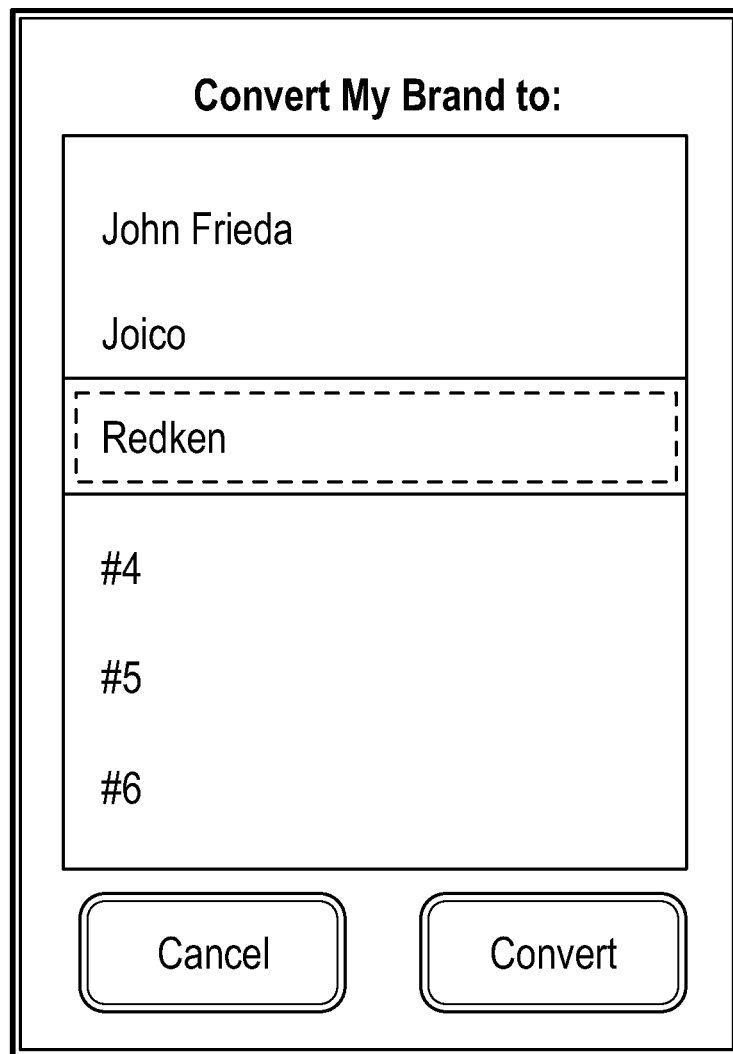
FIG. 5 depicts a screenshot of a conversion pop-up that enables a user to select a desired conversion (e.g., convert a first color system to a second color system)

In some embodiments, upon selecting a virtual "Convert Formula" key, the hair dye color conversion system and method 100 may display a pop-up color conversion screen, as shown in FIG. 5. In other embodiments, selection of the virtual "Convert Formula" key may result in the GUI presented on a display proceeding to a "Conversion" screen. A conversion pop-up screen enables a user to select a desired conversion (e.g., convert a first color system to a second color system). In some embodiments, the first color system may be specific to a first manufacturer (e.g., Wella®) and the second color system may be specific to a second manufacturer (e.g., REDKEN®). Thus, the system and method for hair dye color conversion enables the user to convert color systems of one or more manufacturers into different color systems used by different manufacturers.

In some embodiments, the system and method for hair dye color conversion may enable the user to convert between color systems specific to the same manufacturer. For example, the same manufacturer may sell a first brand that uses a first color system and also sell a second brand that uses a second color system. Upon selecting the desired conversion, "Converting" text accompanied by an animation may be presented to the user via the GUI on a display. Once the system and method for hair dye color conversion is done processing the selected conversion, the GUI presented on display may go back to the client history screen 400 (shown in FIG. 4) with the new converted formula added to the list previously presented to the user. In some embodiments, the new converted formula may be highlighted in a different color enabling quick user-selection.

For example, the system and method for hair dye color conversion may instruct the user to use a different colorant from another product brand and/or manufacturer color line if a colorant from an initial product brand and/or manufacturer color line was unavailable. This other brand and/or manufacturer color line and associated amount may be determined using the system and method for hair dye color conversion. In some embodiments, the system and method for hair dye color conversion may instruct the user to use the same developer but keep the color mix in the hair for a longer period of time than the original formula required to offset for changes in the product brand and/or manufacturer color line. The system and method for hair dye color conversion may also instruct the user to change, for example, the developer (e.g., 30 volume to 40 volume) to compensate for changes associated with the replacement product brand and/or manufacturer color line.

In other embodiments, the hair dye color conversion system and method 100 may enable the user to resolve an inventory problem. The user may instruct the hair dye color conversion system and method 100 that one or more ingredients are unavailable (e.g., out-of-stock) that are needed for a particular formula. The user may inform the hair dye color conversion system and method 100 via one or more inputs on the GUI that the user desires (1) a replacement formula that may use the same color system as the formula calling for the out-of-stock ingredient, (2) a replacement formula that may use a different color system as the formula calling for the out-of-stock ingredient, or (3) a replacement ingredient(s) for the out-of-stock ingredient.

The hair dye color conversion system and method 100 may access the conversion instructions (e.g., Brand 1 to Brand 2, Brand 2 to Brand 1, Manufacturer 1 to Manufacturer 2, color system 1 to color system 2, and the like) from a memory local to the system or from a server. For example, the user may select to convert a selected REDKEN® hair dye color mixture to an equivalent Wella® hair dye color mixture. The system and method for hair dye color conversion may access the server over the Internet after checking whether the conversion data is in memory local to the system from a server.

Figure 6:
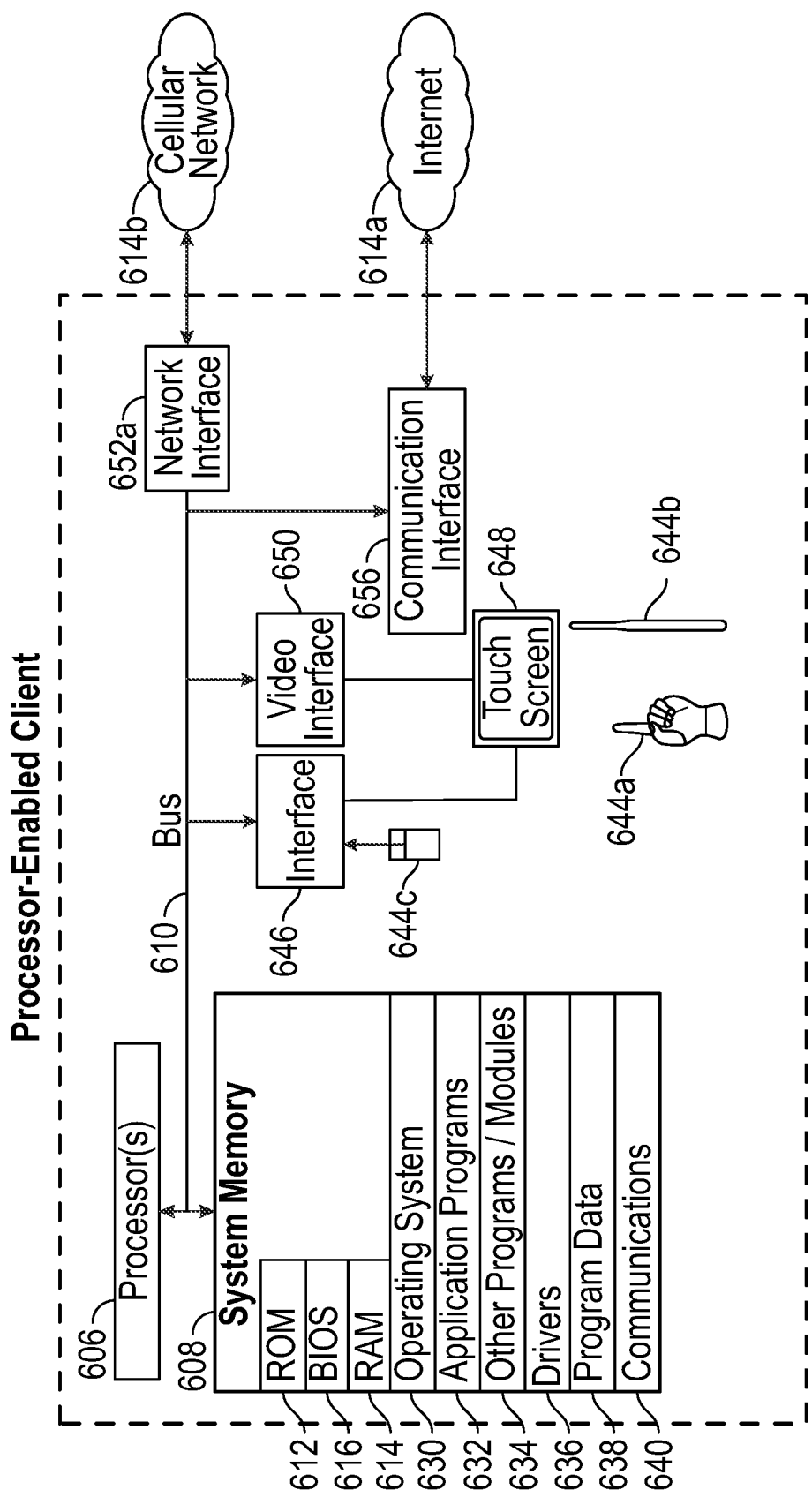
FIG. 6 is a block diagram of an example processor based component used with a hair dye color conversion system and method.

For use in conjunction with the hair dye color conversion system and method 100, FIG. 6 shows a processor based device suitable for implementing computing infrastructure for the hair dye color conversion, as described in FIGS. 3-5. Although not required, some portion of the implementations will be described in the general context of processor executable instructions or logic, such as program application modules, objects, or macros being executed by one or more processors. Those skilled in the relevant art will appreciate that the described implementations, as well as other implementations, can be practiced with various processor based system configurations, including handheld devices, such as smartphones and tablet computers, wearable devices, multiprocessor systems, microprocessor based or programmable consumer electronics, personal computers (PCs), network PCs, minicomputers, mainframe computers, and the like.

In some implementations, the clients in the hair dye color conversion system and method 100 may include one or more processors 606, a system memory 608 and a system bus 610 that couples various system components including the system memory 608 to the processor(s) 606. The processor based clients will, at times, be referred to in the singular herein, but this is not intended to limit the implementations to a single system, since in certain implementations, there will be more than one system or other networked computing device involved. Non limiting examples of commercially available systems include, but are not limited to, ARM processors from a variety of manufactures, Core microprocessors from Intel Corporation, U.S.A., PowerPC microprocessor from IBM, Sparc microprocessors from Sun Microsystems, Inc., PA RISC series microprocessors from Hewlett Packard Company, and 68xxx series microprocessors from Motorola Corporation.

The processor(s) 606 in the processor based clients of the hair dye color conversion system and method 100 may be any logic processing unit, such as one or more central processing units (CPUs), microprocessors, digital signal processors (DSPs), application specific integrated circuits (ASICs), field programmable gate arrays (FPGAs), and the like. Unless described otherwise, the construction and operation of the various blocks shown in FIG. 6 are of conventional design. As a result, such blocks need not be described in further detail herein, as they will be understood by those skilled in the relevant art.

The system bus 610 in the processor based components of the hair dye color conversion system and method 100 can employ any known bus structures or architectures, including a memory bus with a memory controller, a peripheral bus, and a local bus. The system memory 608 includes read only memory (ROM) 612 and random access memory (RAM) 614. A basic input/output system (BIOS) 616, which can form part of the ROM 612, contains basic routines that help transfer information between elements within a processor based device, such as during start up. Some implementations may employ separate buses for data, instructions and power.

The processor based components of the hair dye color conversion system and method 100 may also include one or more solid state memories, for instance, a Flash memory or solid state drive (SSD), which provides nonvolatile storage of computer readable instructions, data structures, program modules and other data for the processor based device. Although not depicted, the processor based device can employ other non-transitory computer or processor readable media, for example, a hard disk drive, an optical disk drive, or a memory card media drive.

Program modules in the processor based components of the hair dye color conversion system and method 100 can be stored in the system memory 608, such as an operating system 630, one or more application programs 632, other programs or modules 634, drivers 636 and program data 638.

The system memory 608 in the processor based components of the hair dye color conversion system and method 100 may also include communications programs 640, for example, a server and/or a web client or browser for permitting the processor based device to access and exchange data with other systems such as user computing systems, websites on the Internet, corporate intranets, or other networks as described below. The communications program 640 in the depicted implementation is markup language based, such as Hypertext Markup Language (HTML), Extensible Markup Language (XML) or Wireless Markup Language (WML), and operates with markup languages that use syntactically delimited characters added to the data of a document to represent the structure of the document. A number of servers and/or web clients or browsers are commercially available, such as those from Mozilla Corporation of California and Microsoft of Washington.

While shown in FIG. 6 as being stored in the system memory 608, operating system 630, application programs 632, other programs/modules 634, drivers 636, program data 638 and server and/or browser can be stored on any other of a large variety of nontransitory processor readable media (e.g., hard disk drive, optical disk drive, SSD and/or flash memory).

A user of a processor based component of the hair dye color conversion system and method 100 can enter commands and information via a pointer, for example, through input devices such as a touch screen 648 via a finger 644$a$, stylus 644$b$, or via a computer mouse or trackball 644$c$ which controls a cursor. Other input devices can include a microphone, joystick, game pad, tablet, scanner, biometric scanning device, and the like. These and other input devices (i.e., I/O devices) are connected to the processor(s) 606 through an interface 646 such as a touch screen controller and/or a universal serial bus (USB) interface that couples user input to the system bus 610, although other interfaces such as a parallel port, a game port or a wireless interface or a serial port may be used. The touch screen 648 can be coupled to the system bus 610 via a video interface 650, such as a video adapter to receive image data or image information for display via the touch screen 648. Although not shown, the processor based components can include other output devices, such as speakers, vibrator, haptic actuator or haptic engine, and the like.

The processor based components of the hair dye color conversion system and method 100 operate in a networked environment using one or more of the logical connections to communicate with one or more remote computers, servers and/or devices via one or more communications channels, for example, one or more networks 614a, 614b. These logical connections may facilitate any known method of permitting computers to communicate, such as through one or more LANs and/or WANs, such as the Internet, and/or cellular communications networks. Such networking environments are well known in wired and wireless enterprise wide computer networks, intranets, extranets, the Internet, and other types of communication networks. Such other types of communication networks include telecommunications networks, cellular networks, paging networks, and other mobile networks.

When used in a networking environment, the processor based components of the hair dye color conversion system and method 100 may include one or more network, wired or wireless communications interfaces 652a, 656 (e.g., network interface controllers, cellular radios, WI FI radios, Bluetooth radios) for establishing communications over the network, for instance, the Internet 614a or cellular network 614b.

In a networked environment, program modules, application programs, or data, or portions thereof, can be stored in a server computing system (not shown). Those skilled in the relevant art will recognize that the network connections shown in FIG. 6 are only some examples of ways of establishing communications between computers, and other connections may be used, including wirelessly.

For convenience, the processor(s) 606, system memory 608, and network and communications interfaces 652a, 656 are illustrated as communicably coupled to each other via the system bus 610, thereby providing connectivity between the above described components. In alternative implementations of the processor based device, the above described components may be communicably coupled in a different manner than illustrated in FIG. 6. For example, one or more of the above described components may be directly coupled to other components, or may be coupled to each other, via intermediary components (not shown). In some implementations, system bus 610 is omitted, and the components are coupled directly to each other using suitable connections.

In the hair dye color conversion system and method 100, various aspects of the systems, methods, functions, steps, features and the like corresponding thereto disclosed herein may be implemented on one or more computer systems using hardware, software, firmware, circuits, or combinations thereof. Hardware, software, firmware, and circuits respectively refer to any hardware, software, firmware, or circuit component. Computer systems referred to herein may refer to any computing device and vice versa (e.g., smart phone, mobile computing device, personal data assistant, tablet computer, laptop computer, desktop computer, other computing device, and the like). For example, each computer system or computing device in the systems described herein or any embodiment of a system disclosed herein may utilize one or more of the following components: a single-core or multi-core hardware processor (e.g., central processing unit or graphics processing unit) on which software instructions are executed (e.g., instructions corresponding to an operating system, an application program, an interpreter such as a virtual machine, or a compiler); a memory associated with and in connection with the hardware processor such as cache or other system memory that stores software instructions or other data that the hardware processor may access for processing; an input device (e.g., mouse, keyboard, touchscreen, and the like); an output device (e.g., display, touchscreen, printer, and the like); a network or communication interface that enables the computer system to communicate over a network or communication protocol; an application program having corresponding software instructions that are executable by a hardware processor. Connections between different computer systems and connections between different computer system components may be wired or wireless.

Virtualization computing techniques, cloud computing techniques, web application/web site computing techniques, traditional and adaptive streaming techniques, and other computing techniques may be implemented by any embodiment of the hair dye color conversion system and method 100 to enable and/or enhance the teachings described herein. For example, in a cloud computing embodiment, one or more servers (i.e., one or more computer systems) may store and execute software instructions corresponding to an application program based on input data received from client devices. In response to the input data received, the application program is executed accordingly, which results in graphical data being processed and output to the client devices for display on a display such as a touch screen on a smart phone or tablet computer.

In another implementation of the hair dye color conversion system and method 100, a web application or website embodiment, data representative of a user input may be transmitted to a server (i.e., a computer system) hosting the website for processing and storage in memory. In an application program embodiment, the application may be stored and executed locally on a user's computer system. In other embodiments, one or more components of the application program may be stored and executed on a server and the user's computer system. For example, a user may download the application program from an app store for an Android computing device, Apple computing device, Windows computing device, Samsung computing device, other computing device, and the like. Execution of the application program on the user's computing device may require that the device transmit and receive data to and from one or more computing devices such as a server or other user's computing device. For example, an application may be downloaded from a server to a mobile device. Upon installation, the mobile device may communicate with a server.

One or more aspects of the hair dye color conversion system and method 100 may be located on (i.e., processed, stored, executed, or the like; or include one or more hardware or software components) a single computer system or may be distributed among a plurality of computer systems attached by one or more communication networks (e.g., internet, intranet, a telecommunications network, and the like). One or more components of a computer system may be distributed across one or more computer systems in communication with the computer system over a communication network. For example, in some embodiments, the systems disclosed herein may utilize one or more servers (i.e., one or more computer systems dedicated for a particular purpose in the system) that may be dedicated to serve the needs of one or more other computer systems or components across a communication network and/or system bus. The one or more servers may provide a central processing location for one or more aspects of the systems disclosed herein.

Those of ordinary skill in the art will appreciate that one or more circuits and/or software may be used to implement the hair dye color conversion system and method 100. Circuits refer to any circuit, whether integrated or external to a processing unit such as a hardware processor. Software refers to code or instructions executable by a computing device using any hardware component such as a processor to achieve the desired result. This software may be stored locally on a processing unit or stored remotely and accessed over a communication network.

As disclosed herein with respect to the hair dye color conversion system and method 100, the phrase "executed by a computing device" includes execution by any hardware component (e.g., CPU, GPU, network interface, integrated circuits, other hardware components, and the like) of the computing device such as a hardware processor. Any module may be executed by a computing device (e.g., by a processor of the computing device). Any method, function, step, feature, result, and the like disclosed herein may be implemented by one or more software modules whether explicitly described or not. Individual components within a computing device may work together to accomplish a desired method, function, step, feature, or result. For example, a computing device may receive data and process the data. A simple example would be that a network interface receives the data and transmits the data over a bus to a processor.

Certain words and phrases used with respect to the hair dye color conversion system and method 100 are set forth as follows. As used throughout this document, including the claims, the singular form "a", "an", and "the" include plural references unless indicated otherwise. Any of the features and elements described herein may be singular, e.g., a sensor may refer to one sensor and a memory may refer to one memory. The terms "include" and "comprise," as well as derivatives thereof, mean inclusion without limitation. The term "or," is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation, such a device may be implemented in hardware, firmware, or software, or some combination of at least two of the same. The functionality associated with any particular controller may be centralized or distributed, whether locally or remotely. Other definitions of certain words and phrases are provided throughout this patent document. Those of ordinary skill in the art will understand that in many, if not most instances, such definitions apply to prior as well as future uses of such defined words and phrases.

A processor (i.e., a processing unit), as used with respect to the hair dye color conversion system and method 100, refers to one or more processing units individually, shared, or in a group, having one or more processing cores (e.g., execution units), including central processing units (CPUs), digital signal processors (DSPs), microprocessors, micro controllers, state machines, and the like that execute instructions. The processors interchangeably refer to any type of electronic control circuitry configured to execute programmed software instructions. The programmed instructions may be high-level software instructions, compiled software instructions, assembly-language software instructions, object code, binary code, micro-code, or the like. The programmed instructions may reside in internal or external memory or may be hard-coded as a state machine or set of control signals. According to methods and devices referenced herein, embodiments describe software executable by the processor and operable to execute certain ones of the method acts. As disclosed herein, a processor may refer to any hardware processor or software processor. A software processor may include or otherwise constitute an interpreter that is executed by a corresponding hardware processor. A computer system according to any embodiment disclosed herein is configured to perform any of the described functions related to the various embodiments of the systems disclosed herein.

In the hair dye color conversion system and method 100, memory may be used in a variety of configurations. As known by one skilled in the art, each memory comprises any combination of volatile and non-volatile, transitory and non-transitory computer-readable media for reading and writing. Volatile computer-readable media includes, for example, random access memory (RAM). Non-volatile computer-readable media includes, for example, read only memory (ROM), magnetic media such as a hard-disk, an optical disk drive, a flash memory device, a CD-ROM, and/or the like. In some cases, a particular memory is separated virtually or physically into separate areas, such as a first memory, a second memory, a third memory, and the like. In these cases, it is understood that the different divisions of memory may be in different devices or embodied in a single memory. The memory may be configured to store data.

In the alternative or in addition, the memory of the hair dye color conversion system and method 100 may be a non-transitory computer readable medium (CRM) wherein the CRM is configured to store instructions executable by a processor. The instructions may be stored individually or as groups of instructions in files. The files may include functions, services, libraries, and the like. The files may include one or more computer programs or may be part of a larger computer program. Alternatively or in addition, each file may include data or other computational support material useful to carry out the computing functions of the systems, methods, and apparatus described in the present disclosure.

Where a range of values is provided with respect to the hair dye color conversion system and method 100, it is understood that each intervening value, to the tenth of the unit of the lower limit unless the context clearly dictates otherwise, between the upper and lower limit of that range and any other stated or intervening value in that stated range is encompassed within the disclosure. The upper and lower limits of these smaller ranges may independently be included in the smaller ranges is also encompassed within the disclosure, subject to any specifically excluded limit in the stated range. Where the stated range includes one or both of the limits, ranges excluding either or both of those included limits are also included in the disclosure.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise.

The foregoing description, for purposes of explanation, uses specific nomenclature and formula to provide a thorough understanding of the disclosed embodiments. It should be apparent to those of skill in the art that the specific details are not required in order to practice the disclosure. The embodiments have been chosen and described to best explain the principles of the disclosed embodiments and its practical application, thereby enabling others of skill in the art to utilize the disclosed embodiments, and various embodiments with various modifications as are suited to the particular use contemplated. Thus, the foregoing disclosure is not intended to be exhaustive or to limit the disclosure to the precise forms disclosed, and those of skill in the art recognize that many modifications and variations are possible in view of the above teachings.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the breadth and scope of a disclosed embodiment should not be limited by any of the above-described exemplary embodiments, but should be defined only in accordance with the following claims and their equivalents.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

The invention claimed is:

1. A method for performing hair color scanning analysis, the method comprising:
   accessing a control system having at least a processor, a memory, and user input controls, the memory configured to store ingredients of a hair dye color combination, each ingredient of the hair dye color combination being from a first manufacturer color line;
   scanning hair to obtain color values representing a hair color;
   generating mathematical values from the obtained color values for individual hair dye colors and color component percentages in the hair dye color combination using a selected original color space in the first manufacturer color line;
   applying a transformation to mathematical values of individual hair dye colors in the hair dye color combination for the first manufacturer color line, wherein the transformation is a modified Kubelka-Munk (KM) transformation;
   multiplying the modified KM transformed values of the individual hair dye colors in the hair dye color combination for the first manufacturer color line by the color component percentages of the individual hair dye colors in the hair dye color combination and then summing them;
   retransforming the summed modified KM transformed values of the individual hair dye colors in the hair dye color combination back into mathematical values in the selected original color space; and
   determining multiple hair dye colors of a second manufacturer color line that are combined to create the retransformed mathematical values for the individual hair dye colors in the hair dye color combination.

2. The method of claim 1, further comprising: applying a correction factor to the retransformed mathematical values that corrects for errors, wherein the correction factor employs a regression algorithm.

3. The method of claim 2, wherein the correction factor estimates color adjustments using a linear regression that reduces influence of outlier data.

4. The method of claim 2, wherein the correction factor employs a regression algorithm that reduces influences of outlier data points.

5. The method of claim 4, wherein the outlier data points are identified by optimizing a threshold for differences between observed and predicted values.

6. The method of claim 2, wherein the correction factor estimates a color factor matrix using a linear regression.

7. The method of claim 2, wherein the correction factor employs a regression algorithm.

8. The method of claim 1, wherein generating mathematical values for the hair color using a selected color space further comprises using color scanning analysis of radiative energy as a function of wavelength of the reflected physical color.

9. The method of claim 1, further comprising:
   predicting a color of a color mixture in a first formula product line; and
   identifying a formula in a second product line that matches the predicted color in the first formula product line.

10. The method of claim 1, further comprising:
    multiplying a product factor matrix by a base color factor matrix to obtain error predictions; and
    adding the error predictions to a baseline prediction to obtain final prediction errors.

11. The method of claim 1, further comprising:
    using a linear regression algorithm to identify an amount of measurement differences between baseline predictions and observed dye-out values; and
    applying a correction factor to remove the identified measurement differences.

12. A system for performing hair color scanning analysis, the system comprising:
    a memory device storing a set of instructions that when executed by one or more processors, causes the one or more processors to:
       access color scanning analysis of hair color in a first manufacturer color line to obtain mathematical RGB data for the hair color using an original color space;
       convert mathematical RGB data of multiple hair dye colors for the first manufacturer color line into a product matrix that accounts for different hair dye color percentages in a hair dye color combination;
       apply a transformation to mathematical values of individual hair dye colors in the hair dye color combination for the manufacturer color line, wherein the transformation is a modified Kubelka-Munk (KM) transformation;
       multiply the modified KM transformed values of the individual hair dye colors in the hair dye color combination for the manufacturer color line by the color component percentages of the individual hair dye colors in the hair dye color combination and then summing them;
       retransform the summed modified KM transformed values of the individual hair dye colors in the hair dye color combination back into mathematical values in the selected original color space; and determine multiple hair dye colors of an another manufacturer color line that to create the retransformed mathematical values for the individual hair dye colors in the hair dye color combination in the original color space.

13. The method of claim 12, further comprising: applying a correction factor to the retransformed mathematical values that corrects for errors, wherein the correction factor employs a regression algorithm.

14. The method of claim 13, wherein the correction factor estimates color adjustments using a linear regression that reduces the influence of outlier data.

15. The method of claim 13, wherein the correction factor employs a regression algorithm that reduces influences of outlier data points.

16. The method of claim 15, wherein the outlier data points are identified by optimizing a threshold for differences between observed and predicted values.

17. The method of claim 13, wherein the correction factor estimates a color factor matrix using a linear regression.

18. The method of claim 13, wherein the correction factor employs a regression algorithm.

19. The method of claim 12, wherein generating mathematical values for the hair color using a selected color space further comprises using color scanning analysis of radiative energy as a function of wavelength of the reflected physical color.

20. The method of claim 12, further comprising:
predicting a color of a color mixture in a first formula product line; and
identifying a formula in a second product line that matches the predicted color in the first formula product line.

21. The method of claim 12, further comprising:
multiplying a product factor matrix by a base color factor matrix to obtain error predictions; and
adding the error predictions to a baseline prediction to obtain final prediction errors.

22. The method of claim 12, further comprising:
using a linear regression algorithm to identify an amount of measurement differences between baseline predictions and observed dye-out values; and
applying a correction factor to remove the identified measurement differences.

23. A hair dye color conversion system for performing color scanning analysis, the system comprising:
one or more processors;
an input device that enables a user to input hair dye color information into the system; and
a memory device storing a set of instructions that when executed by the one or more processors, causes the one or more processors to:
scan hair to obtain color values representing a hair color;
generate mathematical values from the obtained color values for individual hair dye colors and color component percentages in a hair dye color combination using an original color space in the first manufacturer color line;
apply a transformation to mathematical values of individual hair dye colors in the hair dye color combination for the first manufacturer color line, wherein the transformation is a modified Kubelka-Munk (KM) transformation;
multiply the modified KM transformed values of the individual hair dye colors in the hair dye color combination for the first manufacturer color line by the color component percentages of the individual hair dye colors in the hair dye color combination and then summing them;
retransform the summed modified KM transformed values of the individual hair dye colors in the hair dye color combination back into mathematical values in the selected original color space; and
determine multiple hair dye colors of a second manufacturer color line that are combined to create the retransformed mathematical values for the individual hair dye colors in the hair dye color combination.

24. The system of claim 23, wherein the set of instructions stored in the memory device is wrapped in an application program interface (API).

25. The system of claim 23, wherein the API calls the set of instructions, adds a developer as an additional ingredient to the hair dye color combination, creates a new formula, and adds the formula to a list of available formulas for the users.

* * * * *

UNITED STATES PATENT AND TRADEMARK OFFICE
CERTIFICATE OF CORRECTION

PATENT NO. : 11,925,251 B2
APPLICATION NO. : 17/678413
DATED : March 12, 2024
INVENTOR(S) : Cody Z. Nash et al.

Page 1 of 1

It is certified that error appears in the above-identified patent and that said Letters Patent is hereby corrected as shown below:

In the Claims

Column 29, Claim 12, Line 4:
"color line that to create" should read: --color line that are combined to create--.

Signed and Sealed this
Seventeenth Day of June, 2025

Coke Morgan Stewart
*Acting Director of the United States Patent and Trademark Office*